US008380042B2

(12) United States Patent
Kawakami

(10) Patent No.: US 8,380,042 B2
(45) Date of Patent: Feb. 19, 2013

(54) REPRODUCTION DEVICE, REPRODUCTION METHOD, AND PROGRAM

(75) Inventor: Yoshio Kawakami, Osaka (JP)

(73) Assignee: Panasonic Corporation, Osaka (JP)

( * ) Notice: Subject to any disclaimer, the term of this patent is extended or adjusted under 35 U.S.C. 154(b) by 589 days.

(21) Appl. No.: 12/601,302

(22) PCT Filed: Apr. 10, 2009

(86) PCT No.: PCT/JP2009/001673
§ 371 (c)(1),
(2), (4) Date: Nov. 23, 2009

(87) PCT Pub. No.: WO2009/128232
PCT Pub. Date: Oct. 22, 2009

(65) Prior Publication Data
US 2010/0189416 A1    Jul. 29, 2010

(30) Foreign Application Priority Data

Apr. 16, 2008  (JP) .................................. 2008-106389

(51) Int. Cl.
| H04N 9/80 | (2006.01) |
| H04N 5/94 | (2006.01) |
| H04N 9/88 | (2006.01) |
| G06F 13/00 | (2006.01) |
| G06F 13/28 | (2006.01) |
| G06F 9/00 | (2006.01) |
| G06F 15/177 | (2006.01) |
| G06F 1/00 | (2006.01) |

(52) U.S. Cl. ........ 386/240; 386/239; 386/248; 386/263; 711/117; 711/156; 713/2; 713/323

(58) Field of Classification Search .......... 386/239–248; 711/117, 154–156; 713/2, 323
See application file for complete search history.

(56) References Cited

U.S. PATENT DOCUMENTS

| 4,907,150 | A | 3/1990 | Arroyo et al. |
| 6,131,166 | A * | 10/2000 | Wong-Insley ................ 713/300 |
| 6,618,813 | B1 * | 9/2003 | Hsu et al. ...................... 713/323 |
| 2003/0140205 | A1 * | 7/2003 | Dahan et al. .................. 711/163 |
| 2004/0003398 | A1 * | 1/2004 | Donian et al. .................. 725/34 |
| 2004/0168030 | A1 * | 8/2004 | Traversat et al. ............. 711/133 |

(Continued)

FOREIGN PATENT DOCUMENTS

| JP | 62-169218 | 7/1987 |
| JP | 2002-140858 | 5/2002 |

(Continued)

OTHER PUBLICATIONS

English language Abstract of JP 2008-165872, Jul. 17, 2008.

(Continued)

*Primary Examiner* — Thai Tran
*Assistant Examiner* — Hung Dang
(74) *Attorney, Agent, or Firm* — Greenblum & Bernstein. P.L.C.

(57) ABSTRACT

When AV playback and an operation of BD-J application are executed in conjunction with each other, the playback apparatus saves values stored by the currently executed BD-J application into a nonvolatile memory upon termination of the BD-J application or the like. Next time the playback starts, the playback apparatus restores the values to an area accessible by the BD-J application, and subsequently, activates the BD-J application.

14 Claims, 21 Drawing Sheets

U.S. PATENT DOCUMENTS

| | | | |
|---|---|---|---|
| 2004/0228618 A1* | 11/2004 | Yoo et al. | 386/95 |
| 2005/0102396 A1* | 5/2005 | Hipp | 709/224 |
| 2006/0056803 A1* | 3/2006 | Seo et al. | 386/69 |
| 2006/0140091 A1* | 6/2006 | Iwamoto et al. | 369/53.2 |
| 2006/0282612 A1 | 12/2006 | Ikeda et al. | |
| 2007/0086727 A1* | 4/2007 | Tanaka et al. | 386/95 |
| 2007/0223876 A1* | 9/2007 | Hashimoto et al. | 386/95 |
| 2008/0209082 A1 | 8/2008 | Hatanaka et al. | |
| 2008/0285947 A1 | 11/2008 | Hashimoto et al. | |
| 2009/0070671 A1 | 3/2009 | Ogata et al. | |
| 2009/0103902 A1 | 4/2009 | Matsuura et al. | |
| 2009/0232312 A1 | 9/2009 | Inoue et al. | |
| 2010/0014832 A1* | 1/2010 | Ikeda et al. | 386/95 |

FOREIGN PATENT DOCUMENTS

| | | |
|---|---|---|
| JP | 2003-77222 | 3/2003 |
| JP | 3438729 | 6/2003 |

OTHER PUBLICATIONS

English language Abstract of JP 2007-287327, Nov. 1, 2007.
English language Abstract of JP 2007-234213, Sep. 13, 2007.
English language Abstract of JP 3438729, Jun. 13, 2003.
English language Abstract of JP 2003-77222, Mar. 14, 2003.
English language Abstract of JP 62-169218, Jul. 25, 1987.
English language Abstract of JP 2002-140858, May 17, 2002.

* cited by examiner

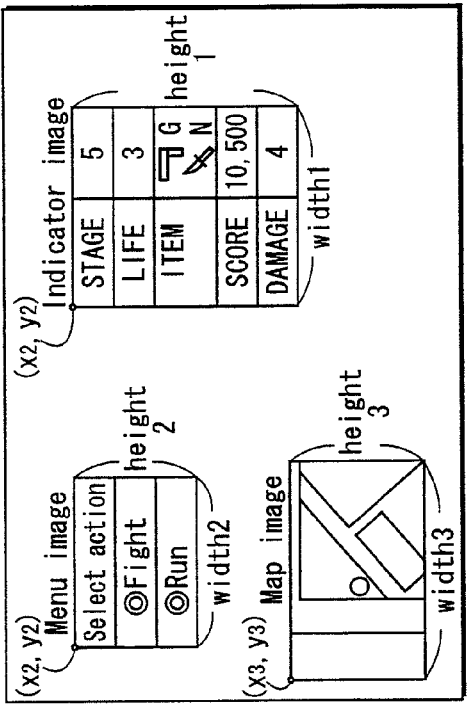
FIG. 5B Storage contents in graphics plane 11
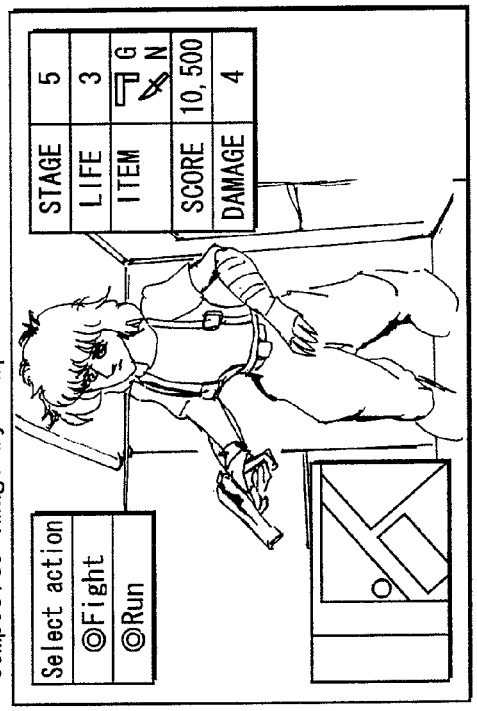
FIG. 5C Composite image by composition unit 12
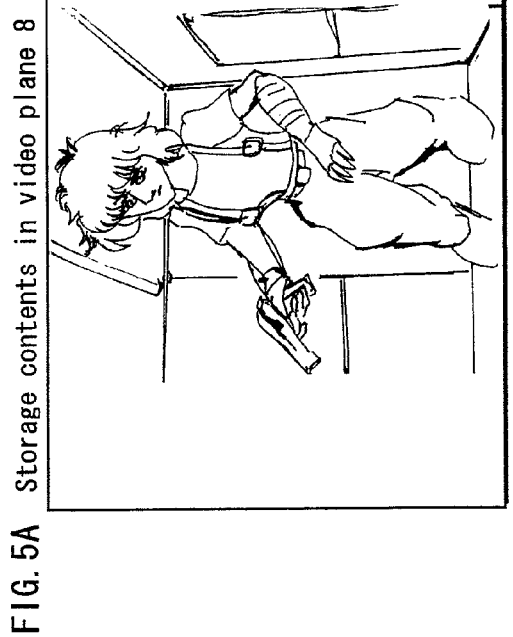
FIG. 5A Storage contents in video plane 8

FIG. 6

Register set 24

General-purpose registers (GPR)

| No. | Value |
|---|---|
| 0 | Indicator image.PNG |
| 1 | (X1, Y1) |
| 2 | (width1, height1) |
| 3 | STAGE:5 |
| 4 | LIFE:3 |
| 5 | ITEM:G, N |
| 6 | SCORE:10, 500 |
| 7 | Menu image.PNG |
| 8 | (X2, Y2) |
| 9 | (width2, height2) |
| 10 | Select action |
| 11 | Fight |
| 12 | Run |
| 13 | Map image.PNG |
| 14 | (X3, Y3) |
| 15 | (width3, height3) |

Player status registers (PSR)

| No. | Value |
|---|---|
| 0 | 0x00000001 |
| 1 | 0x000000FF |
| 2 | 0x0FFF0FFF |
| 3 | 0x00000001 |
| 4 | 0x0000FFFF |
| 5 | 0x0000FFFF |
| 126 | 0x00000000 |
| 127 | 0x00000000 |

Player setting registers

| No. | Value |
|---|---|
| 0 | 1 |
| 1 | 2 |
| 2 | 1 |
| 3 | 1 |
| 4 | 0 |
| 5 | 1 |
| 6 | 1 |
| 7 | 0 |
| 8 | 0 |
| 9 | |
| 4093 | 0 |
| 4094 | 0 |
| 4095 | 0 |

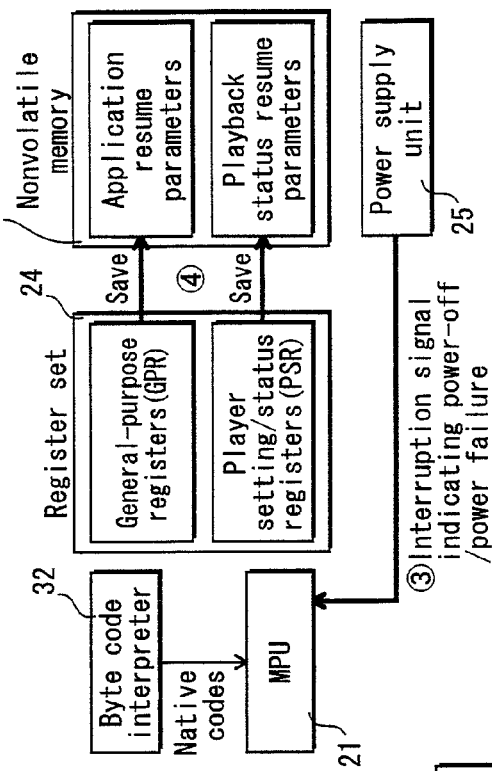
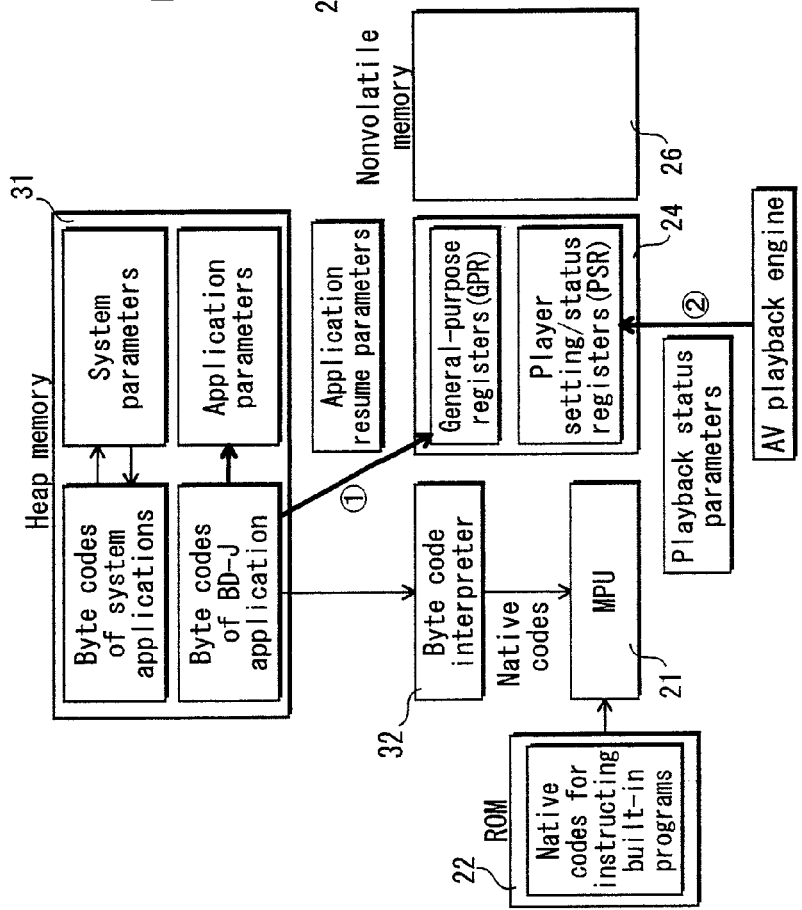
FIG. 7B
FIG. 7A

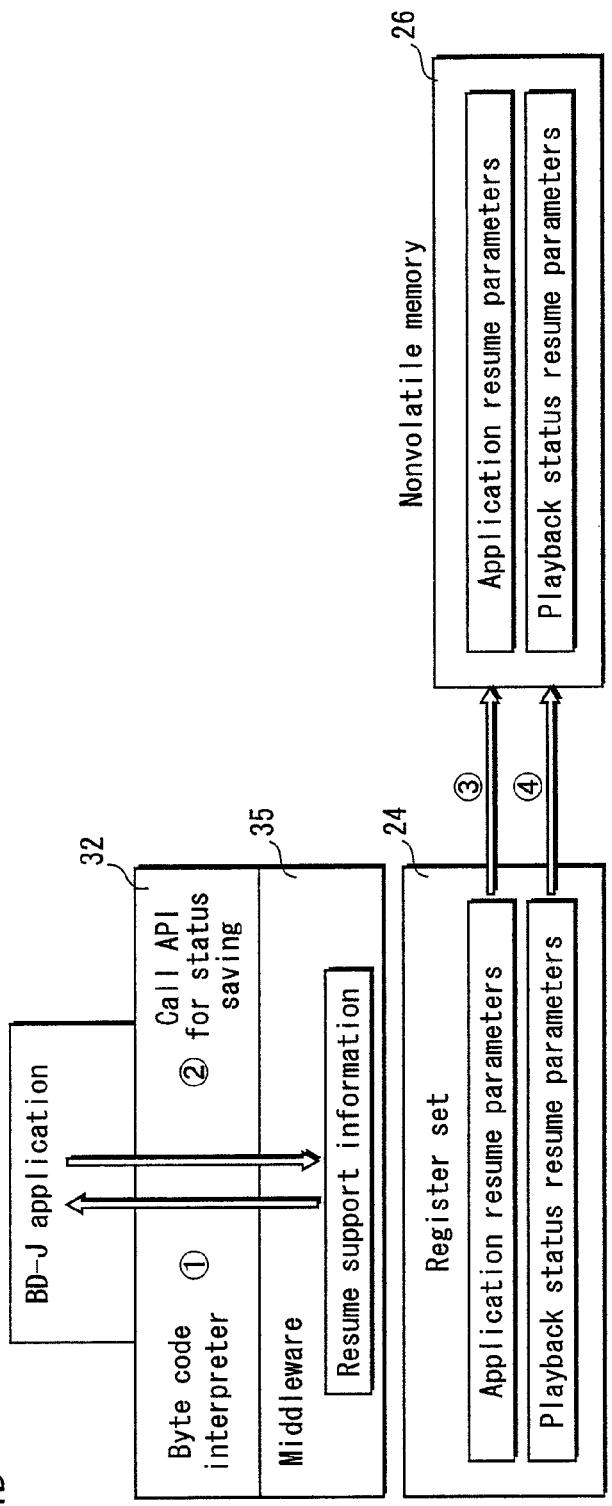

Restoration  1 : Indicating that contents saved from PSR and GPR
flag              can be restored
             0 : Indicating that contents saved from PSR and GPR
                  cannot be restored Use flag    1 : Indicating that contents restored to PSR and GPR
                  can be used
             0 : Indicating that contents restored to PSR and GPR
                  cannot be used It is not possible to resume from status prior to power-OFF No resume flag in title common information and title individual information corresponding to current title is ON It is possible to resume from status prior to power-OFF Resume Resume flag in title common information or title individual information corresponding to current title is ON

REPRODUCTION DEVICE, REPRODUCTION METHOD, AND PROGRAM

TECHNICAL FIELD

The present invention belongs to a technical field of status-saving and status-restoring technology.

BACKGROUND ART

Status saving is a technique to write data required for resuming an operation, onto a nonvolatile storage medium. This is performed in case of an unexpected event of a sudden cutoff of power supply to an apparatus. As with conventional measures against power outages, this processing is considered essential for stable operations of the apparatus. On the other hand, status restoring is a technique to resume the operation which was being executed before the power cutoff, after the power supply to the apparatus is restarted, based on the data written onto the nonvolatile storage medium. In playback apparatuses which execute AV playback of DVD-Video, the status saving and the status restoring are performed as follows: before AV playback stops, a physical or a logical playback position is written onto the nonvolatile storage medium; and the next playback is resumed from the playback position written onto the nonvolatile storage medium.
Patent Document 1: Japanese Patent No. 3438729
Patent Document 2: Japanese Laid-Open Patent Application No. 2003-77222
Patent Document 3: Japanese Laid-Open Patent Application No. S62-169218

DISCLOSURE OF THE INVENTION

Problems the Invention is Going to Solve

There are two types of contents for AV playback: DVD-Video contents and BD-ROM contents. Instruction sets used in the DVD-Video contents are commands that are interpreted by a so-called command interpreter. In this case, merely saving a value of a program counter that indicates which instruction was being executed, retention values of registers, and the like enables status restoring.

On the other hand, for the BD-ROM contents, AV playback and Java applications operate in conjunction with each other. Operations of Java applications require multiple threads, a huge number of variables, various screen rendering parameters, and the like. Accordingly, before power supply to the apparatus is cut off, all of these multiple threads, variables, various screen rendering parameters need to be written onto the nonvolatile storage medium to resume the operation which was being executed prior to the power cutoff. In addition, it is necessary to write memory information used for operations of the Java applications, management information held by the operating system (OS), and the like onto the nonvolatile storage medium, and to cause the apparatus to execute processing called suspend or hibernation.

However, in general, the capacity of a nonvolatile storage area and hardware resources of consumer electronics (CE) apparatuses such as BD-ROM playback apparatuses are often smaller compared to those of personal computers. Accordingly, part of the information required for resuming an operation may not be written onto the nonvolatile storage medium for status saving. When this occurs, proper performance of the resumed operation cannot be ensured. Assume that an attempt is made to resume the operation with part of the information to be status-saved missing, the playback apparatus may suffer from a hung-up or a blackout. Since CE apparatuses require to ensure a much higher quality than personal computers, status saving and status restoring with a risk of operation failures such as the above are unacceptable for practical use.

The object of the present invention is to provide a playback apparatus that is able to stably resume an operation of an application after a power cutoff even in a case where the size of a nonvolatile storage medium used for status saving is limited.

Means of Solving the Problems

In order to solve the above-mentioned aim, one aspect of the present invention is a playback apparatus for realizing saving and restoring of statuses of a plurality of processes, one of the processes being playback of an AV stream, and another of the processes being processing of an application in conjunction with the playback of the AV stream, the playback apparatus comprising: a read unit operable to read the application and the AV stream from a recording medium; a platform unit that allows the application to run; a playback unit operable to play back the AV stream; and a first storage medium that has a volatile storage area in which playback status parameters have been written, the playback status parameters showing in what state the playback of the AV stream is performed, wherein the application has written, into the volatile storage area, one or more parameters selected from among a plurality of parameters used in the platform unit as application resume parameters required for resuming an operation of the application after the restoring of the statuses, the saving of the statuses is performed by writing the application resume parameters and the playback status parameters into a nonvolatile storage area of a second storage medium, and the restoring of the statuses is performed by writing the application resume parameters and the playback status parameters back into the volatile storage area, and loading the application to the platform unit based on the playback status parameters written back into the volatile storage area.

Effects of the Invention

The playback apparatus with the above-described solution performs status restoring by re-loading the application based on the playback status resume parameters. Because the application is loaded again for the status restoring, it is not necessary to write multiple threads, variables, various screen rendering parameters, memory information, and OS management information into the nonvolatile storage medium. Without a need to write these information, the size of the nonvolatile storage medium can be reduced to the minimum necessary.

Additionally, because the application resume parameters are written into the storage area of the volatile storage medium, the operation of the application can be resumed only by loading the application again.

The application can realize a counter measure for power-outage only by selecting, from among parameters used for the operation, parameters necessary for resuming the operation after the status restoring and writing the selected parameters into the storage area of the volatile storage medium. Accordingly, overhead for status saving and status restoring for the application can be reduced compared with when the application directly writes operation parameters into a nonvolatile memory. Furthermore, because a counter measure for power failure can be executed while also minimizing the overhead, the performance of the apparatus will not decline.

Thus, if the playback apparatus executes, for example, a game in which AV playback and an operation of the application proceed in conjunction with each other, it is possible to resume the game somewhere in the middle with parameters of the characters such as scores maintained.

It should be noted that resuming an operation in the above-described playback apparatus requires active involvement of the application. If parameters required for resuming the operation are not selected from among the parameters used in the heap area, the resuming cannot be executed, and consequently, an inconsistency may occur between the operation of the application and the operation of the playback apparatus. Such a problem can be solved by configuring the above-described playback apparatus as follows.

That is, the playback apparatus is configured such that the recording medium further has resume information recorded thereon, the resume information indicating whether or not the playback unit and the application use the playback status parameters and the application resume parameters written back into the volatile storage area, after the restoring of the statuses, and if the resume information indicates affirmatively, the playback unit resumes the playback based on the playback status parameters written back into the volatile storage area, and the application resumes the operation using the application resume parameters written back into the volatile storage area, and if the resume information indicates negatively, the playback unit does not resume the playback of the AV stream, and the application does not resume the operation.

In the playback apparatus with the addition of the above-described inventive particular matter, when the application supports selecting the parameters required for resuming the operation as the application resume parameters, resuming can be allowed by setting the resume information accordingly. On the other hand, if the application does not support selecting the parameters required for resuming the operation as the application resume parameters, resuming can be prohibited by setting the resume information accordingly. As is apparent from the above, whether resume playback is allowed or not can be controlled based on the judgement of a content creator. Accordingly, playback in accordance with the content creator's intention can be achieved.

When the content creator prefers that a content including video, audio, and Java™ applications not be resumed, resuming can be restricted depending on how the resume information is set. As a result, an unexpected operation by the user will not trigger operations unintended by the content creator.

In general, power supply to a playback apparatus is shut down based on an operation of the user who uses the apparatus, and when the user shuts down the power cannot be foreseen.

Accordingly, if power is shut down by a user operation before the application saves the parameters into the nonvolatile memory for the status saving, information stored on the volatile storage medium gets all cleared, failing to be saved onto the nonvolatile storage medium. In this case, even if the power is turned ON again, the operation of the Java™ application cannot be resumed from the status prior to the power shutdown, because the information has not been saved on the nonvolatile storage medium. Even if resumed, the operation becomes unstable.

As described above, if an unforeseen operation by the user triggers an operation unintended by the content creator, the content creator may prefer that the content including video, audio, and the Java™ applications not be resumed. Meanwhile, conventional resume apparatuses are unable to reflect the intention of the content creator because the playback apparatus can perform resuming only with its own functions.

This problem can be resolved by configuring the above-described playback apparatus as follows.

That is, the above-described playback apparatus further holds resume support information that indicates whether or not a content of the volatile storage area is able to be saved into the nonvolatile storage area, wherein upon activation of the application, the resume support information is transferred to the application, and the application resume parameters are written into the nonvolatile storage only if the resume support information received by the application indicates affirmatively.

In a playback apparatus that has no power backup for a volatile memory and thus loses the content of the volatile memory due to a sudden power OFF by a user operation, it is likely that the parameters for the status restoring are not properly saved. In this case, the resume support information set to "saving not possible" can inform the application properly that the parameters cannot be saved. As a result, the application does not expect the playback apparatus to perform resuming, and accordingly, performing resuming of an operation based on unstable parameters can be avoided.

In a playback apparatus that has a power backup for a volatile memory and thus is able to save the content of the volatile memory even at an occurrence of a sudden power OFF, the parameters for the status restoring are properly saved. In such a playback apparatus, the resume support information set to "saving possible" can inform the application properly that the parameters can be saved. As a result, the application can expects the playback apparatus to perform resuming.

Because whether resuming is supported or not in the playback apparatus is notified to the application, and the application, executes necessary operations required for resuming based on this information, the playback apparatus and the application can interact with each other more closely.

BRIEF DESCRIPTION OF THE DRAWINGS

FIG. 5 show contents of the BD-ROM provided for playback by the playback apparatus;

FIG. 6 is a schematic diagram showing an example of contents of a register set 24;

FIG. 7 are schematic diagrams showing transitions of application resume parameters and playback status parameter during status saving;

FIG. 11 show resume support information and an example of an API call based on the resume support information;

BEST MODE FOR CARRYING OUT THE INVENTION

In the following, embodiments of the present invention will be described with reference to the drawings.

First Embodiment

Figure 1:
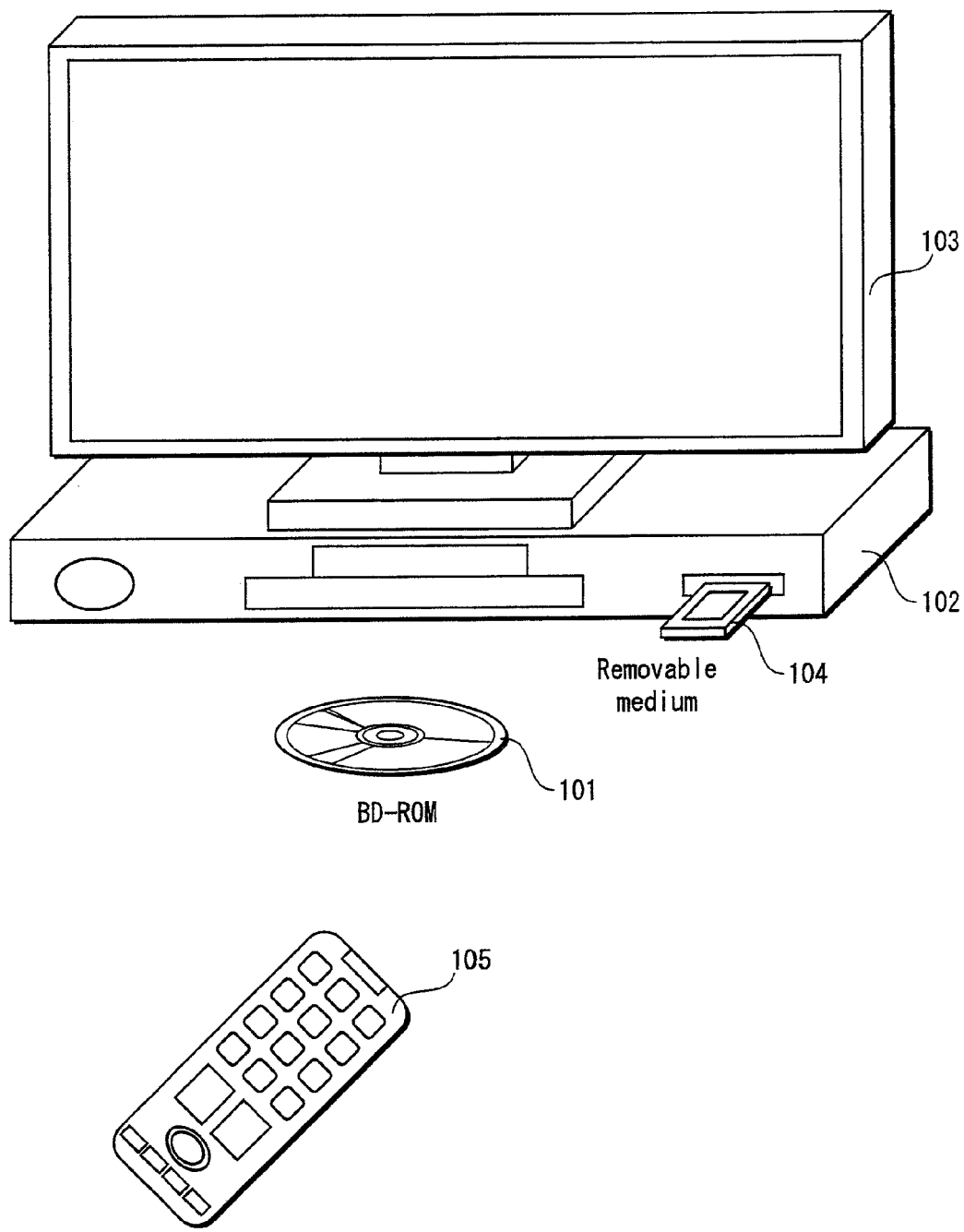
FIG. 1 shows a use form of a playback apparatus 102.

The following describes an embodiment of a playback apparatus. Firstly, a form of use among forms of implementation of the playback apparatus pertaining to the present invention is described. FIG. 1 shows the form of use of a playback apparatus 102. As shown in FIG. 1, the playback apparatus 102 is used by a user along with a BD-ROM 101, a TV 103, and a removable medium 104.

The BD-ROM 101 is a recording medium having a movie recorded thereon.

The playback apparatus 102 constitutes a home theater system together with the TV 103, and plays back the BD-ROM 101.

The TV 103 provides an interactive operation environment to the user by displaying playback video of a movie or displaying a menu.

The removable medium 104 is loaded into the playback apparatus and used as a storage for storing contents distributed from a WWW server of a movie distributor. Accordingly, contents downloaded via a network and stored on the removable medium 104 and contents recorded on the BD-ROM 101 can be combined to expand/update the contents recorded on the BD-ROM 101. In order to load the removable medium 104, the playback apparatus 102 has insertion slots for inserting an SD memory card, a memory stick, a Compact Flash™, a smart media card, a multi-media card, and the like.

The remote controller 105 is provided as an accessory of the playback apparatus 102. The remote controller 105 receives an operation for the playback apparatus 102 from a user and transmits an instruction signal to the playback apparatus 102 in accordance with the operation.

Described above is the form of use of the playback apparatus. Described next is a recording medium to be played back by the playback apparatus. The recording medium played by the playback apparatus is the BD-ROM 101, which is an optical recording medium.

Described above is the form of use of the playback apparatus. Described next is a recording medium to be played back by the playback apparatus. In the given example, the recording medium played by the playback apparatus is the BD-ROM 101, which is an optical recording medium.

Figure 2:
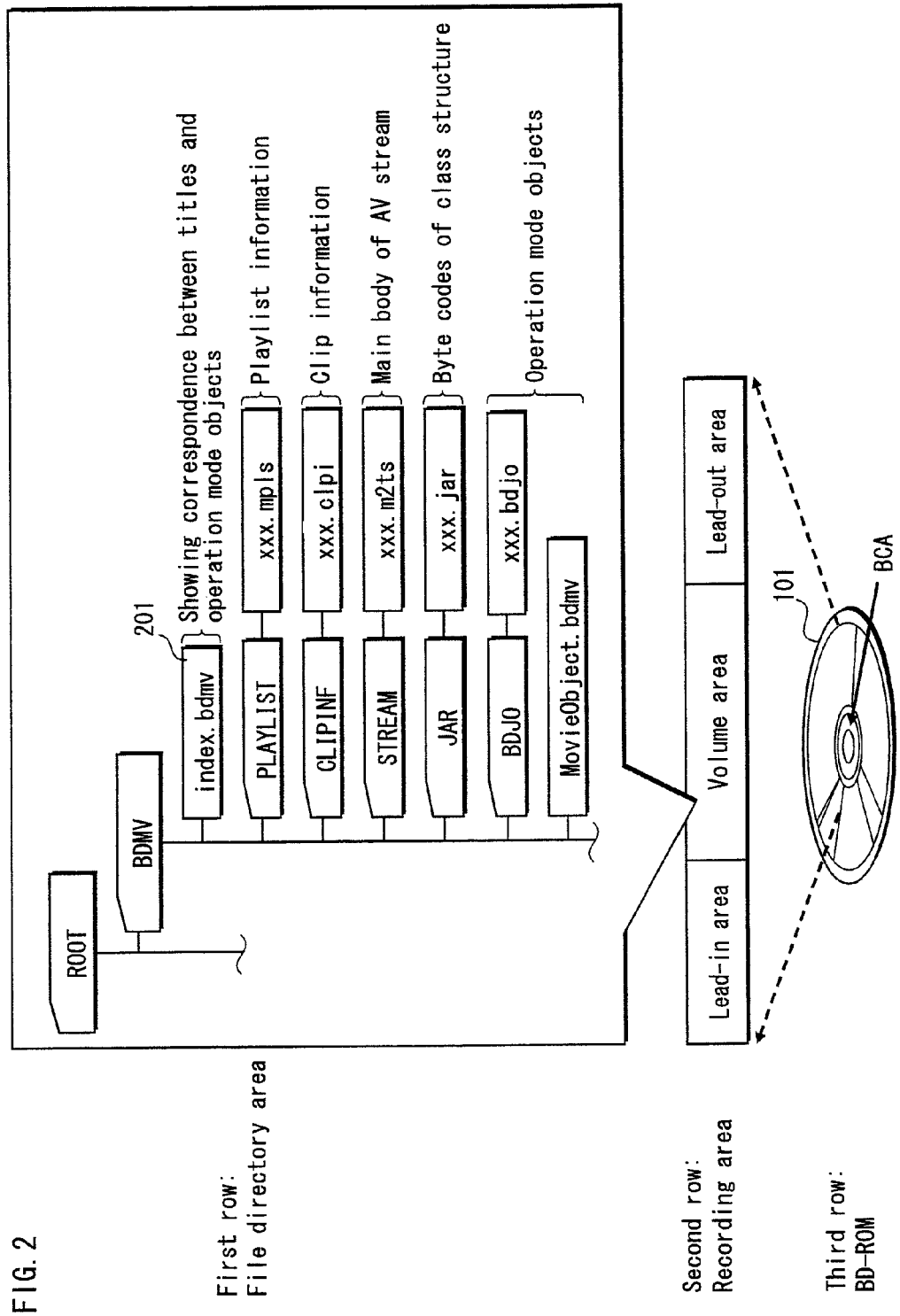
FIG. 2 shows a structure of a BD-ROM.

FIG. 2 shows the structure of a BD-ROM (hereinafter, also referred to as "BD"). In the present embodiment, the BD-ROM is described with a focus on AV applications for playing back AV contents such as a movie. However, the BD-ROM can be used as a recording medium for computers, like a CD-ROM or a DVD-ROM. As is the case with other optical discs such as a DVD and a CD, the BD-ROM has a storage area in a spiral form from the inner circumference to the outer circumference of the BD-ROM, and has, between a lead-in of the inner circumference and a lead-out of the outer circumference, a logical address space in which logical data can be recorded. Additionally, inside the lead-in, there is a special area called BCA (Burst Cutting Area) which can be read only by drives Being unreadable by applications, this area is often used for copyright protection technology.

Volume information of a file system is recorded at the start of the logical address space. Application data such as video is recorded following the volume information. The file system conforms to standards such as UDF and ISO9660, and similar to a conventional PC, the file system allows stored logical data to be read using a directory/file structure. File/directory names having 255 characters can be read.

According to the file/directory structure of the BD disc in the present embodiment, a BDMV directory is placed under a root directory (ROOT). The BDMV directory is a directory that stores data such as AV contents related to the BD-ROM, and management information.

Under the BDMV directory exist five subdirectories known as a PLAYLIST directory, a CLIPINF directory, a STREAM directory, a JAR directory, and a BDJO directory, and two types of files, namely index.bdmv 201 and MovieObject.bdmv are placed in the BDMV directory.

In the STREAM directory exists a file forming the main body of the digital stream, with the extension "m2ts" being assigned to this file (xxx.m2ts ["xxx" being variable and the extension "m2ts" being fixed]). In the PLAYLIST directory exists a file (xxx.mpls) with the extension "mpls" (["xxx" being variable and the extension "mpls" being fixed]). In the CLIPINF directory exists a file (xxx.clpi) with the extension "clpi" (["xxx" being variable and the extension "clpi" being fixed]). In the JAR directory exists a file (xxx.jar) with the extension "jar" (["xxx" being variable and the extension "jar" being fixed]). In the BDJO directory exists a file (xxx.bdjo) with the extension "bdjo" (["xxx" being variable and the extension "bdjo" being fixed]).

The file with the extension "m2ts" is a digital AV stream of the MPEG-TS (Transport Stream) format, and is obtained by multiplexing at least one video stream, at least one audio stream, and at least one graphics stream. The video stream represents a moving picture part of the film, and the audio stream represents an audio part of the film.

The file with the extension "clpi" is a piece of clip information corresponding to a digital AV stream. Clip information, being management information, contains an EP_map showing the head location of a GOP and information such as the encoding format, frame rate, bit rate and resolution etc. of the digital AV stream.

The file with the extension "mpls" stores playlist information. Playlist information includes MainPath information, Subpath information, and playlistMark information.

1) MainPath information specifies one or more logical playback sections by specifying at least one pair of a point in time as In_Time and a point in time as Out_time on the playback time axis of an AV stream, and has a stream number table (STN_table). The stream number table specifies which elementary stream among the elementary streams multiplexed into the AV stream is allowed to be played back, and which is not.

2) PlaylistMark information specifies, as a chapter, a given period out of a portion of the AV stream specified by a pair of In_time information and Out_Time information.

3) Subpath information specifies an elementary stream to be played back in synchronization with the AV stream, and includes a pair of In_time information and Out_Time information on the playback time axis of the specified elementary stream. AV playback can be started as the Java applications for playback control instructs Java™ virtual machine to generate JMF player instance for playing back the playlist information. The JMF (Java Media Frame work) player instance is actual data generated in a heap memory of the virtual machine based on the JMF player class.

A pair of an AV stream and a piece of playlist information constitute "title", which is a unit of playback. AV playback of the BD-ROM is performed in units of titles. BD-ROM contents are a group of titles, i.e., a title set. Among the titles existing in the root/BDMV directory, the title to be played back first is specifically referred to as "first play title". Additionally, the playlist information and the Clip information are classified into "static scenario".

The file with the extension "jar" is a Java™ archive file, and describes programs of the Java applications which perform dynamic scenario control using Java™ virtual machine. The Java™ archive file conforms to the specification described in http://Java™.sun.com/j2se/1.4.2/docs/guide/jar/jar.html The Java™ archive file stores multiple files in a form of a directory structure. According to this directory structure, directly under the root directory exists "XXXX.class", and under the META-INF directory exist a file "MANIFEST.MF", a file "SIG-BD.SF", a file "SIG-BD.RSA", and a file "bd.XXXX.perm".

The file "XXXX.class" (class file) is a class file that stores a class structure for defining Java applications executable by Java™ virtual machine. The file "MANIFEST.MF" corresponds to a digital certificate. The file "SIG-BD.SF" describes therein a hash value of "MANIFEST.MF". The file "SIG-BD.RSA" describes therein a digital certificate chain and signature information. The file "bd.XXXX.perm" is a permission request file, and stores therein information which permission is to be given to the Java application for execution.

The Java applications defined by the class file in the Java™ archive file is Java™ Xlet which is controlled by the application manager via the Xlet interface. The Xlet interface has four states: "loaded", "paused", "active", and "destroyed".

Also, the Java applications realize HAVi framework specified by GEM 1.0.2, using standard Java library to display JFIF (JPEG), PNG, and other image data. HAVi framework is a GUI framework including remote control navigation mechanism specified in GEM 1.0.2. The Java applications can achieve a screen display in which a moving image is displayed on the screen together with buttons, texts, and online display (contents of BBS) based on the HAVi framework, and it is possible to perform operations on the displayed screen using remote control.

The file with the extension "bdjo" and MovieObject.bdmv (fixed file name) are operation mode objects. The operation mode objects are data that defines a control procedure for each of multiple operation modes of the playback apparatus. The operation modes of the playback apparatus include the following: an operation mode in which the command interpreter performs control (HDMV mode); and an operation mode in which Java platform performs control (BD-J mode). In the HDMV mode, the command interpreter which operates in the HDMV mode performs control. Accordingly, the control is defined by DVD-Video-like navigation commands. On the other hand, in the BD-J mode, the Java platform which operates in the BD-J mode performs control. Accordingly, the control is defined by Java byte codes, as realized with DVB-MHP.

An operation mode object in the BD-J mode is referred tows a BD-J object. The BD-J object is information that defines a title by associating an AV stream indicated by playlist information, and a Java application. The BD-J object indicates "application management table" and a list of playlists which are automatically playable in the title. The application management table lists identifiers of applications (application ID) and IDs of Java archive files which belong to each application to specify the applications whose life cycle corresponds with the title. In other words, one application is composed of one or more Java archive files. The BD-J object specifies playlist information to be automatically played back in the title. Playback of the playlist information specified to be automatically played back starts automatically when the title corresponding to the BD-J object becomes the current title. Note that the Java applications whose operations are defined by the BD-J objects are referred to as "BD-J applications".

The operation mode object in the HDMV mode is referred to as a movie object. The movie object includes a scenario program in which a scenario for dynamically changing proceeding of playback of each title in the HDMV mode (described later) is described.

The index.bdmv 201 (the file name "index.bdmv" is fixed) is management information on the entire BD-ROM and includes information such as organizationID (32 bit) for identifying a provider of a movie, discID (128 bit) assigned to each BD-ROM provided by the provider, and the like. After the disc is loaded into the playback apparatus, the index.bdmv 201 is read first, and the disc is uniquely identified by the playback apparatus. In addition, the index.bdmv 201 includes a table indicating multiple playable titles in the BD-ROM and BD-J objects specifying the respective titles, in correspondence with each other.

Figure 3:
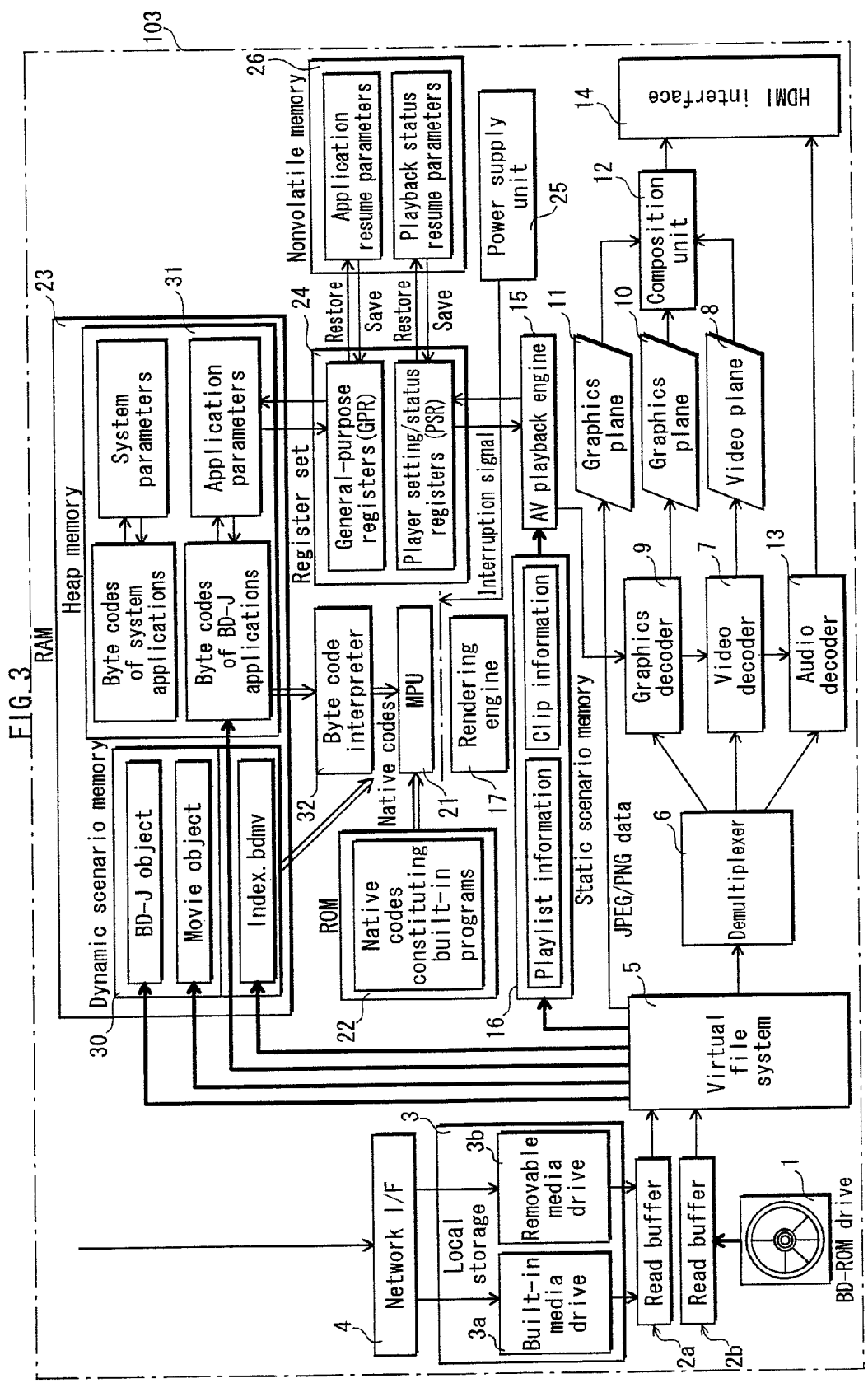
FIG. 3 is a block diagram showing a general functional structure of the playback apparatus.

FIG. 3 is a block diagram showing a general functional structure of the playback apparatus. As shown in the figure, the playback apparatus is composed of a BD-ROM drive 1, read buffers 2a and 2b, a local storage 3, a network I/F 4, a virtual file system 5, a demultiplexer 6, a video decoder 7, a video plane 8, a graphics decoder 9, a graphics plane 10, a graphics plane 11, a composition unit 12, an audio decoder 13, an HDMI interface 14, an AV playback engine 15, a static scenario memory 16, a rendering engine 17, an MPU 21, a ROM 22, a RAM 23, a register set 24, a power supply unit 25, a nonvolatile memory 26, a dynamic scenario memory 30, a heap memory 31, and a byte code interpreter 32.

The BD-ROM drive 1 performs loading/ejecting of a BD-ROM, and accessing of the BD-ROM.

The local storage 3 includes a built-in media drive 3a and a removable media drive 3b, and is used for saving downloaded additional contents and data used by applications. For each BD-ROM, there is a separate storage area for the additional contents, and for each application, there is an area used by the application for storing data. Additionally, merge information describing merge rules such as how the downloaded additional contents are merged with data on the BD-ROM are also stored in the built-in media drive 3a and the removable media drive 3b.

The read buffers 2a and 2b are each an FIFO memory in which TS packets read from the BD-ROM or the local storage 3 are stored in the First-In-First-Out basis.

The network interface 4 is used for communicating with the outside of the playback apparatus, and allows an access to an Internet-accessible server, a locally-networked server, and the like. For example, the network interface 4 is used for downloading a BD-ROM additional content released on the Internet, or enables playback of a content that uses network functions. This is achieved by performing data communication with a server on the Internet, which is specified by the content. The BD-ROM additional content is content which is not contained in the original BD-ROM and, for example, is additional secondary audio, subtitles, bonus video, or an application. The network interface 4 can be controlled from the Java platform which operates in the BD-J mode, and additional contents released on the Internet can be downloaded into the built-in media drive 3a or the removable media drive 3b.

The virtual file system 5 constructs a virtual BD-ROM (virtual package) by merging an additional content stored in the built-in media drive 3a or the removable media drive 3b and the contents on the BD-ROM based on the merge management information downloaded into the built-in media drive 3a or the removable media drive 3b along with the additional content. The command interpreter which operates in the HDMV mode and the Java platform which operates in the BD-J mode refer to the virtual package and the original BD-ROM without distinguishing them from each other. During playback of the virtual package, the playback apparatus performs playback control using both of the data on the BD-ROM and the data in the built-in media drive 3a or the removable media drive 3b.

The demultiplexer 6 demultiplexes TS packets constituting AV streams and outputs the resultant data to the video decoder 7, the graphics decoder 9, and the audio decoder 13.

The video decoder 7 decodes video frames output from the demultiplexer 6 and writes the pictures in uncompressed form into the video plane 8.

The video plane 8 is a memory for storing the pictures in uncompressed form.

The graphics decoder 9 decodes graphics data output from the demultiplexer 6 and writes the graphics in compressed form into the graphics plane 10.

The graphics plane 10 is a buffer for storing graphics obtained by decoding graphics streams read from the demultiplexer 6.

The graphics plane 11 is a buffer for storing one plane of graphics drawn by the BD-J application.

The composition unit 12 composites graphics developed in the graphics plane 11 with the pictures in uncompressed form stored in the video plane 8, and outputs the resultant composite video.

The audio decoder 13 decodes audio frames output from the demultiplexer 6 and outputs the audio data in uncompressed form.

The HDMI interface 14 transmits the composite video composited by the composition unit 12 and the audio data in uncompressed form decoded by the audio decoder 13, to the TV 103.

The AV playback engine 15 executes AV playback functions or playlist playback functions when it receives a function call from the command interpreter which operates in the HDMV mode or the Java platform which operates in the BD-J mode. The AV playback function includes functions succeeded from DVD players and CD players, such as the playback start, playback stop, pause, release of pause, release of still picture function, fast-forward at speed specified by immediate value, rewind at speed specified by immediate value, audio switch, subtitle switch, and angle switch. The playlist playback function includes some of these AV playback functions, such as the playback start and playback stop, where the play-list playback functions are performed based on the playlist information.

The static scenario memory 16 is a memory for storing the current playlist information and the current clip information. The current playlist information is a piece of playlist information that is currently being processed, among multiple pieces of playlist information accessible from the BD-ROM drive 1, the built-in media drive 3a, or the removable media drive 3b. The current clip information is a piece of clip information that is currently being processed, among multiple pieces of clip information accessible from the BD-ROM drive 1, the built-in media drive 3a, or the removable media drive 3b.

The rendering engine 17 has infrastructure software such as Java 2D or OPEN-GL. The rendering engine 17 renders computer graphics in accordance with instructions from the Java platform that performs execution in the BD-J mode, and outputs the rendered computer graphics to the image plane 11.

The MPU 21, being the core of the computer architecture of the playback apparatus, fetches and interprets native codes stored in the ROM 22 and executes processing of the playback apparatus based on the native codes.

The ROM 22 has built-in programs of the playback apparatus pre-stored therein.

The RAM 23 constitutes a memory space in which the dynamic scenario memory 30 and the heap memory 31 are arranged.

The register set 24 is an area for storing a playback status of a playlist, arbitrary information used by the contents, and the like. The playback status of the playlist indicates such as which AV data among various AV data information pieces described in the playlist is being used and which position (time) of the playlist is being played back. If the playback status of the playlist changes, the AV playback engine 15 stores the changed status into the register set 24. Also, the register set 24 can store values specified by the contents or transfer the stored values to an application in accordance with instructions from the command interpreter which operates in the HDMV mode or the application executed by the Java platform which operates in the BD-J mode.

The power supply unit 25 supplies power using a commercial power source or an internal power source. When power is turned ON, an interruption signal indicating the turn-ON to the MPU 21, and a power failure/power-off occurs, outputs an interruption signal indicating the power failure/power-off to the MPU 21.

The nonvolatile memory 26 is a recording medium (also referred to as a storage medium) such as a readable and writable memory, and is able to retain the recorded contents without power supply (e.g. a flash memory or a FeRAM). Additionally, a writable recording medium such as a built-in medium or a removable media is applicable as the nonvolatile memory 26. Also, a medium accessible via the network I/F (4) 21 is applicable as the nonvolatile memory 26 if the medium can retain the recorded contents irrespective of the power supply status of the playback apparatus.

The dynamic scenario memory 30 is a memory for storing a current dynamic scenario that is to be provided for processing performed by the command interpreter which operates in the HDMV mode or the Java platform which operates in the BD-J mode. The current dynamic scenario is what is currently being executed among the Index.bdmv, the BD-J object, and the movie object recorded on the BD-ROM drive 1, the built-in media drive 3a, or the removable media drive 3b.

The heap memory 31 is a stack area for storing byte codes of the system applications, byte codes of the BD-J applications, and system parameters used by the system applications, and application parameters used by the BD-J applications.

The byte code interpreter 32 converts the byte codes stored in the heap memory 31 to native codes and makes the MPU execute processing according to the native codes.

Figure 4:
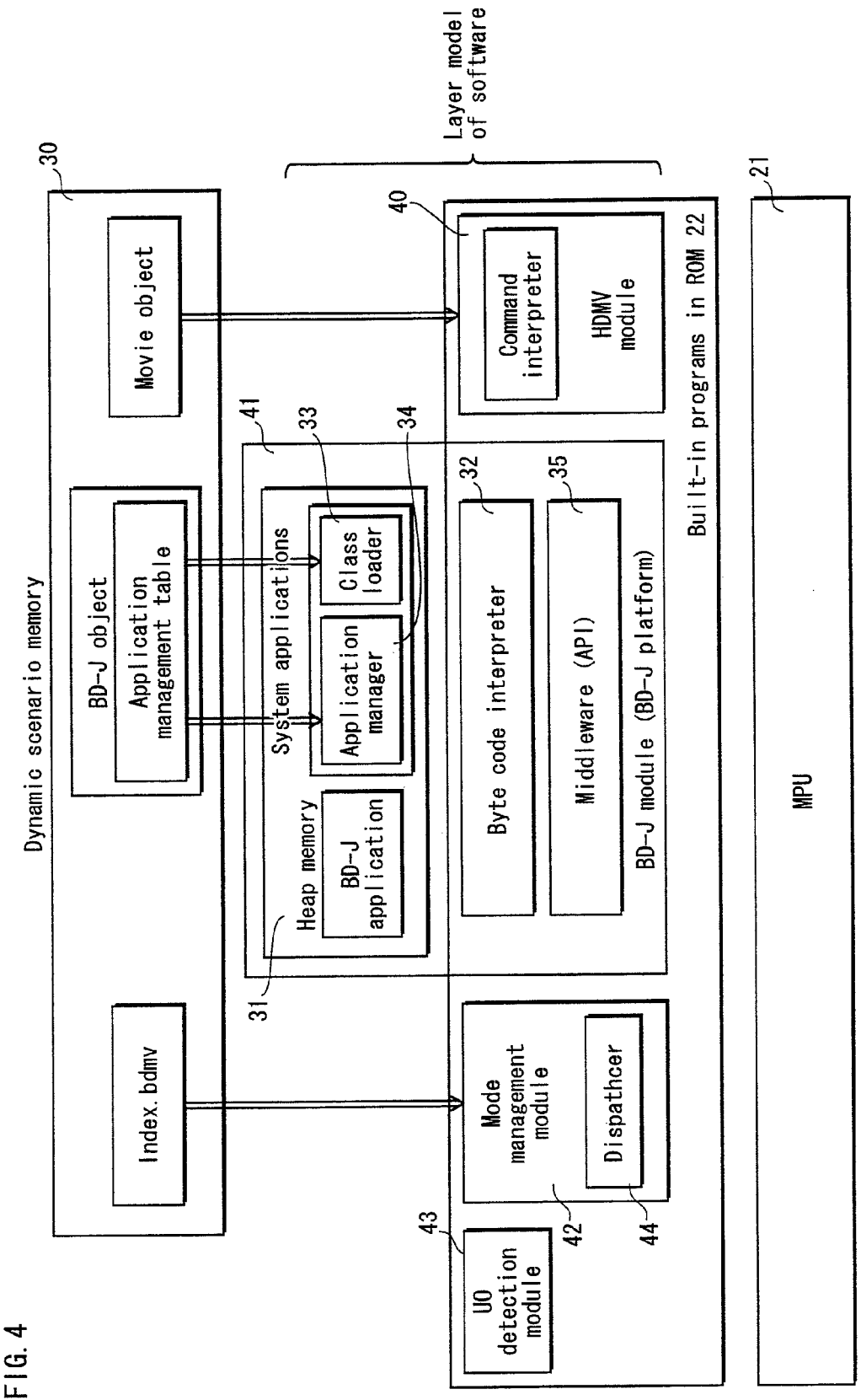
FIG. 4 shows a software layer model of the playback apparatus.

FIG. 4 shows the software layer model of the playback apparatus. According to the software layer model, above the MPU 21 exist three modules which perform operations: an HDMV module 40, a BD-J module 41, and a mode management module 42. These perform controls using the Index.bdmv, the BD-J object, or the movie object stored in the dynamic scenario memory 30. The BD-J module 41 is composed of layers of the following hierarchy: the middleware 35—the byte code interpreter 32—the heap memory 31. In the heap memory 31 exist the BD-J application, a class loader 33, and an application manager 34.

The memory card drive 30, the heap memory 31, and the byte code interpreter 32 in the figure have been described using FIG. 3, and description thereof is omitted. In the following, description is given on structural components which have not been described yet.

The class loader 33 is one of the system applications, and loads a
BD-J application by reading the byte codes from the class file included in the JAR archive file and stores the read byte codes into the heap memory 31.

The application manager 34 is one of the system applications, and performs application signaling of the BD-J application such as activating the BD-J application, terminating the BD-J application, and the like, based on the application management table in the BD-J object.

The middleware 35 is an operating system for the built-in software and is composed of a kernel and a basic input/output system of the operating system. Also, the middleware 35 provides various functions to the BD-J application in accordance with an API call from the BD-J application.

The HDMV module 40 is a DVD virtual player composed of the command interpreter which operates in the HDMV mode, and performs execution in the HDMV mode. The command interpreter which operates in the HDMV mode interprets and executes the navigation commands constituting the scenario program. Because the navigation commands are described using a syntax similar to DVD-Video, execution of the navigation commands realizes playback control in a manner similar to DVD-Video.

The BD-J module 41 is the Java platform which performs operations in the BD-J mode. The BD-J module 41 is composed of Java™ virtual machine, configurations, and profiles, and includes the byte code interpreter 32, the class loader 33, the application manager 34, and the middleware 35.

The mode management module 42 stores the Index.bdmv read from the BD-ROM drive 1, the built-in media drive 3a or the removable media drive 3b, and performs mode management and branch control. The mode management by the mode management module 42 is allocation of modules. That is, the mode management module 16 decides which of the HDMV module 40 and the BD-J module 41 is to execute the dynamic scenario.

A UO detection module 43 detects an operation made to a remote control or the front panel of the playback apparatus, and outputs information indicating the user operation (hereinafter, referred to as UO (User Operation)) to the mode management module 42.

A dispatcher 44 selects only UOs that are suitable for the current mode of the playback apparatus, and passes the selected UOs to the module that operates in the mode. For example, in the case of receiving UOs such as up, down, right and left key operation or an activation operation in the HDMV mode, the dispatcher 44 outputs the UOs to the module that is in the HDMV mode.

In the present playback apparatus, specially created part is resuming of BD-ROM contents. Resuming is to resume an operation by three processing, i.e., "saving", "restoring", and "using", after power supply is cut off. The "saving" is to write parameters used for resuming the operation, which exist in a volatile storage medium, onto a nonvolatile storage medium. The "restoring" is to write back the parameters used for resuming the operation from the nonvolatile storage medium to the volatile storage medium. The "using" is to transfer the parameters from the volatile storage medium to the BD-J applications and the AV playback engine to provide for the operation of the application or the playback control. The resuming includes the following types.

The first type of resuming is "mode management resume". This is to maintain the same mode before power-off and after power-on. That is, the playback apparatus operates in the HDMV mode or in the BD-J mode before power-off and after power-on. The mode management resume is performed by the mode management module which executes mode management. Among the parameters to be saved onto the nonvolatile storage medium, those parameters required for the mode management are referred to as "mode management resume parameters". In the mode management resume, Index.bdmv, and operation mode objects (BD-J objects or movie objects) that correspond with the current title are the mode management parameters. Because these are stored in the dynamic scenario memory 30, writing the contents of the dynamic scenario memory 30 onto the nonvolatile memory 26 enables the status saving.

The second type of resuming is "playback status resume". This is resuming for the operation to be commonly executed in the HDMV mode and the BD-J mode, that is, resuming for maintaining the same playback control of a playlist. Parameters used for the playback status resume are called playback status resume parameters. In the playback status resume, values stored in the player status registers are the playback status resume parameters. Here, the current title number is necessary for the mode management resume. However, because it is stored in the player status registers, the current title number is processed as one of the playback status resume parameters. The current playlist information and the current clip information stored in the static scenario memory 16 are not included in the playback status resume parameters in the present embodiment. This is because these are indicated by the player status registers; they can be obtained by reading the BD-ROM again based on the storage values of the player status registers.

The third type of resuming is "application resume". This is to maintain the same operation of the application before power-off and after power-on. Among the parameters to be saved onto the nonvolatile storage medium, those parameters to be used for the application resume are referred to as "application resume parameters". The above-described three resumes are required for resuming of the BD-ROM contents. The overall control of these resumes is performed by the mode management module 42.

BD-ROM contents require playback of moving images and execution of an application to be performed in conjunction with each other. One typical example is game contents which require playback of moving images while proceeding the game in accordance with user operations. Another typical example is online shopping contents which require playback of moving images while executing online shopping on a Web page in accordance with user operations. Hereinafter, a description is given on a case where game contents are provided as the BD-ROM contents.

FIG. 5 shows contents of the BD-ROM provided for playback by the playback apparatus. FIG. 5A shows an example of a moving image obtained by decoding of picture data in AVClip by the video decoder 7. In the HDMV mode, video is played back with this picture data as its main feature.

FIG. 5B shows an example of storage contents of the graphics plane 11. Here, it is assumed that the BD-J applications execute a game which requires playback of moving images. Accordingly, in the graphics plane 11, graphics indicating an indicator is presented in a size of a horizontal height and a vertical width (height 1, width 1) at a display coordinate (X1, Y1). This indicator represents the stage number (STAGE: 5), a life value (LIFE: 3), an item used in the game (ITEM: G, N), a score (SCORE: 10,500) and damage (4).

At a display coordinate (X2, Y2), a menu is arranged in a size of a horizontal height and a vertical width (height 2, width 2). This menu displays character strings ("fight" and "run").

At a display coordinate (X3, Y3), a map is arranged in a size of a horizontal height and a vertical width (height 3, width 3). When these contents are stored in the RAM 8 and the composition unit 12, the TV 103 displays a composite video image shown in FIG. 5C. Because the storage contents in FIG. 5B indicates a GUI of the game, a lively performance can be achieved in the screen using combinations of moving images and the GUI display by the application.

The following describes the register set 24.

The register set 24 is a storage medium such as a memory having a readable/writable volatile storage area. For example, when the user turns on a power supply switch (not depicted) of the playback apparatus of the BD-ROM, power is supplied to the register set 24, enabling information written into the register set 24 to be stored therein. When the power supply switch (not depicted) of the playback apparatus of the BD-ROM is turned off, power supply to the register set 24 stops, which clears the information stored in the register set 24.

FIG. 6 is a schematic diagram showing an example of contents of the register set 24. The register set 24 is composed of player setting registers, player status registers, and general purpose registers.

The player setting registers store therein configurations of the playback apparatus. The configurations of the playback apparatus include such as audio language setting, subtitle language setting, TV display setting, and age setting of the playback apparatus. Storage contents of the registers need to be stored even after the power supply is turned-OFF. Accordingly, the storage contents are backed up onto the nonvolatile memory 26.

The player status registers (PSR) are registers having numbered storage places each for storing a value. For example, in a storage place numbered with a certain figure, the identifier of the playlist currently being played back is stored; in another storage place with another number, the identifier of the audio currently being used is stored. The playback position of the AV stream currently being played back can be identified based on the values stored in these storage positions. The AV playback engine 15, the HDMV module 40, or the BD-J module 41 stores values into the numbered storage positions of the player status registers. The contents acquire/store a value corresponding to the specified number from/to the player status registers or the general purpose registers, via the AV playback engine 15, the HDMV module 40, or the BD-J module 41.

Major PSR are described below.

PSR1 specifies one of multiple audio streams playable in the current play item. When the set value of the PSR 1 changes, the playback apparatus plays back the audio stream specified by the changed set value. The PSR 1 is set to 0xFF as an initial value, and can be set to a value ranging from 1 to 32 by the playback apparatus. 0xFF is an undefined value, and indicates that no audio stream exists, or no audio stream is selected. The set value ranging from 1 to 32 is interpreted as the audio stream number.

PSR 4 is set to a value ranging from 1 to 100 to indicate a title to which the current playback position belongs.

PSR 5 is set to a value ranging from 1 to 999 to indicate a chapter number to which the current playback posit ion belongs, and is set to a value 0xFFFF to indicate that chapter numbers are invalid in the playback apparatus.

PSR 6 is set to a value ranging from 0 to 999 to indicate the number of the current playlist to which the current playback position belongs.

PSR 7 is set to a value ranging from 0 to 255 to indicate the number of the current play item to which the current playback position belongs.

PSR8 is set to a value ranging from 0 to 0xFFFFFFFF to indicate the current playback position (current PTM) with a time accuracy of 45 KHz. The above is a description on the PSR.

In the following, exemplary processing is described. In the exemplary processing, a BD-ROM content is played back, and a BD-J application constituting a title included in the BD-ROM content saves information necessary for resume playback when the playback of the title stops.

In the general-purpose registers, among the application parameters used in the heap memory 31 by the BD-J application, application parameters required for resuming the operation next have been written by the BD-J application. The parameters shown in the figure, i.e., the data file name corresponding to the indicator (indicator image.PNG), the display coordinate of the indicator (X1, Y1), the vertical height and the horizontal width (height1, width1), the stage number (STAGE: 5), the life value (LIFE: 3), the item used in the game (ITEM: G,N), and the score (SCORE: 10,500) are parameters judged by the BD-J application to be required for rendering the screen of FIG. 5A again.

<Processing Performed when Playback Stops>

When instructed to stop the title playback by receiving a notification of an occurrence of power supply turned-OFF, power interruption, or the like, the BD-J application performs the following: the BD-J application selects parameters required for resuming the operation from among various parameters existing in the heap memory, i.e., values of variables used in the operation, display coordinates, time information of the current point in time and the like, and writes them into the general-purpose registers as parameters (application resume parameters) to be saved into the nonvolatile memory. In addition to these parameters, the BD-J application further acquires, as application resume parameters, information to be saved, from the player setting registers and the player status registers. Furthermore, the BD-J application stores the application resume parameters in the general-purpose registers (hereinafter, referred to as saving of application resume parameters). Upon completion of the saving of the application resume parameters, the BD-J application notifies the BD-J module 41 of the completion. Note that the application resume parameters are the same as Java resume parameters in the description of the basic application.

Upon receiving a completion notification from a BD-J application, the BD-J module 41 stops the BD-J application.

Having stopped the BD-J application, the BD-J module 41 notifies the mode management module 42 that the title has stopped.

Upon receiving a notification that the playback of the title has stopped, the mode management module 42 saves the playback status resume parameters in the register set 24 to the nonvolatile memory 26. These playback status resume parameters include parameters such as a title number, which are required for the mode management performed by the mode management module 42.

<Processing Performed when Playback Resumes>

The following describes operations for resuming the title playback upon the power supply being turned-ON again after the playback of the content stops.

The mode management module 42 judges whether the content to be played back corresponds to the contents of the register set 24 saved in advance.

One method for judging the above correspondence is to check whether the recording medium has been ejected. If the recording medium has not been ejected, it is obvious that the content corresponds to the contents of the register set 24 saved for the mode management resume. Another exemplary method for realizing the judgement is to compare the content identification information of the content corresponding to the contents of the register set 24 saved for the mode management resume, and the content identification information of the content to be played back.

Here, if the content to be played back is judged not to correspond to the contents of the register set 24 saved for the mode management resume, restoring processing described below is not executed, and instead, normal playback processing determined by the BD-ROM is performed. The description hereinafter is under the assumption that the content to be played back corresponds with the contents of the register set 24.

When the playback of the content starts, prior to the start of a title playback, the contents of the register set 24 saved in advance are restored. When a title is to be played back, the mode management module 42 instructs the BD-J module 41 to play back the title. The BD-J module 41 activates the BD-J application associated with the title.

When activated, the BD-J application can acquire the information saved for the application resume and restores the previous operation status.

It is judged whether the BD-J application has failed to acquire the application resume parameters and whether the acquired contents are different from the expected values. If it is judged that the BD-J application has failed to acquire the application resume parameters, or the acquired contents are different from the expected values, the acquired information is not used, and playback is started from the beginning. If the acquired application resume parameters match the expected values, the BD-J application restores the previous playback status based on the acquired application resume parameters. AV playback can be resumed from the playback position where the AV playback has stopped, using, for example, the ID of the playlist acquired from the number 0 and the time indicating how far the playback has advanced acquired from the number 1.

In a case of having saved a title number for the mode management resume, the mode management module 42 realizes resume playback in which where the resume playback starts is specified by the title number, as follows: when playback of the same content is resumed, the mode management module 42 starts playback from the saved title number, instead of performing playback in a normal playback order.

With these processing, the playback apparatus 102 is able to perform resume playback of a title.

FIG. 7 are schematic diagrams showing transitions of the application resume parameters and the playback status parameter during status saving.

In the figures, the register set 24 and the heap memory 31 in the internal structure shown in FIG. 3 are extracted and illustrated. Arrows added to the register set 24 and the heap memory 31 schematically show transitions of the application resume parameters and the playback status resume parameters.

FIG. 7A is a diagram schematically showing the application resume parameters written into the general-purpose registers by the BD-J application, and the playback status resume parameters written into the player status registers. The figure shows how the application resume parameters and the playback status resume parameters are written into the register set.

FIG. 7B shows transitions of the application resume parameters and the playback status resume parameters in a case where an interruption signal indicating a power supply turn-OFF/power supply failure is received. An arrow marked with encircled number "3" schematically shows output of the interruption signal from the power supply unit 25 to the MPU 21. Upon receiving the interruption signal, as shown by an arrow marked with encircled number "4", the application resume parameters in the general-purpose registers and the playback status resume parameters in the player status registers are written into the nonvolatile memory 26. As a result, it is indicated that preparation for turning OFF the power supply is completed.

FIG. 8 are schematic diagrams showing transitions of the application resume parameters and the playback status parameter in status restoring and using. In the figures, the register set 24, the heap memory 31, and the byte code interpreter 32 in the internal structure shown in FIG. 3 are extracted and illustrated. Arrows added to these components schematically show transitions of the application resume parameters and the playback status resume parameters.

Figure 8B:
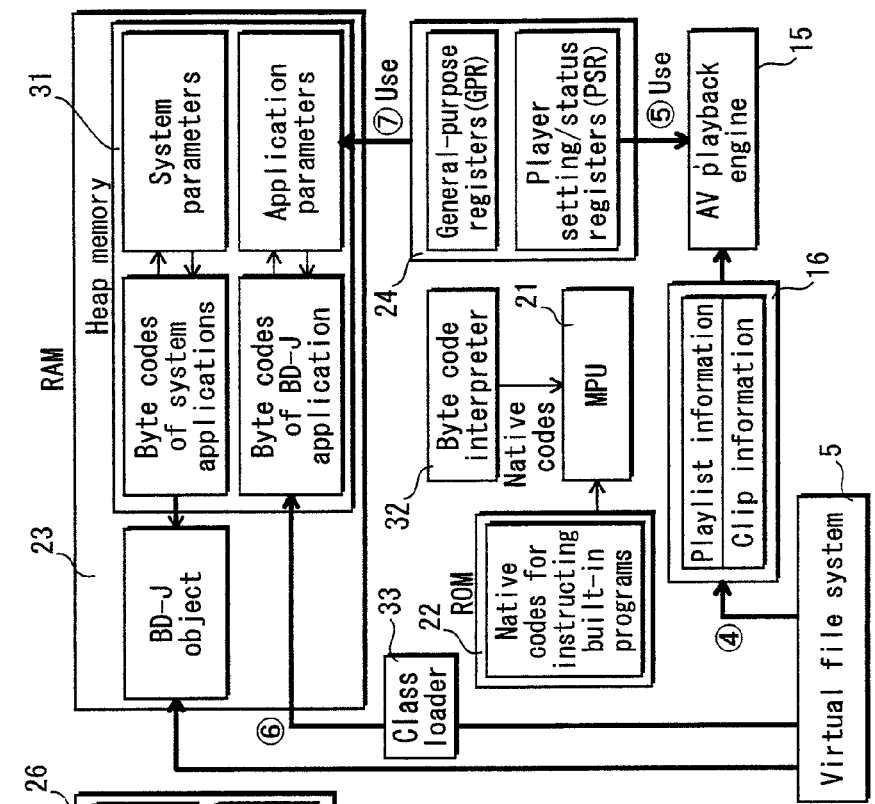
FIG. 8 are schematic diagrams showing transitions of application resume parameters and playback status parameter during status restoring and using.
Figure 8A:
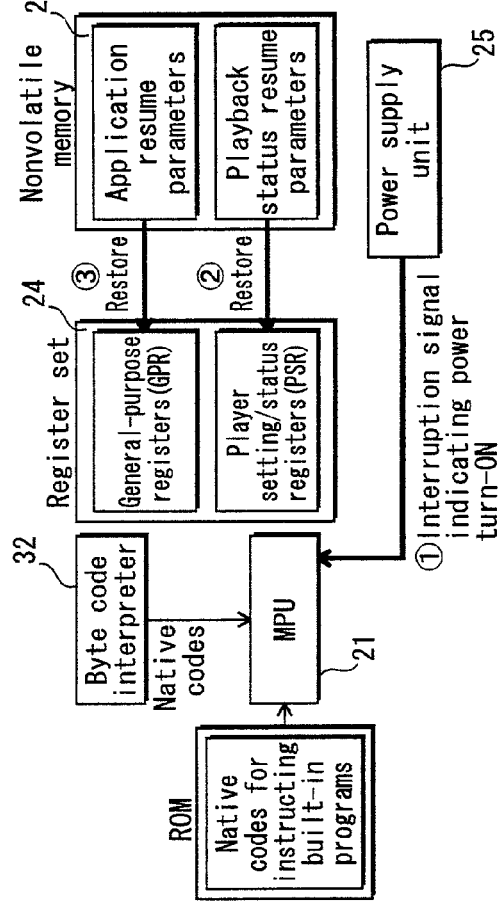

FIG. 8A shows restoring of the application resume parameters and the playback status parameters. An arrow marked with encircled number "1" schematically shows output of an interruption signal indicating that power supply is turned ON, from the power supply unit 25 to the MPU 21. Upon reception of the interruption signal, the application resume parameters and the playback status resume parameters are written into the general-purpose registers and the playback status resume parameters of the register set 24.

Arrows marked with encircled number "2" and "3" schematically show transitions of the application resume parameters and the playback status resume parameters when the interruption signal indicating that the power supply is turned ON is received.

FIG. 8B shows using of the application resume parameters and the playback status resume parameters. In the figure, the current playlist number and the current clip number are specified when the playback status resume parameters are set to the playback status parameters. An arrow marked with encircled number "4" schematically shows the playlist information and the clip information read into the static scenario memory 16; an arrow marked with encircled number "5" schematically shows the playlist information and the clip information read by the AV playback engine 15.

The current title number is specified when the playback status resume parameters are set to the player status registers. An arrow marked with encircled number "6" schematically shows reading of the BD-J object based on the current title number, and class-loading of the BD-J application based on the BD-J object.

An arrow marked with encircled number "7" schematically shows reading of the application resume parameters from the general-purpose registers to the heap memory.

Figure 9:
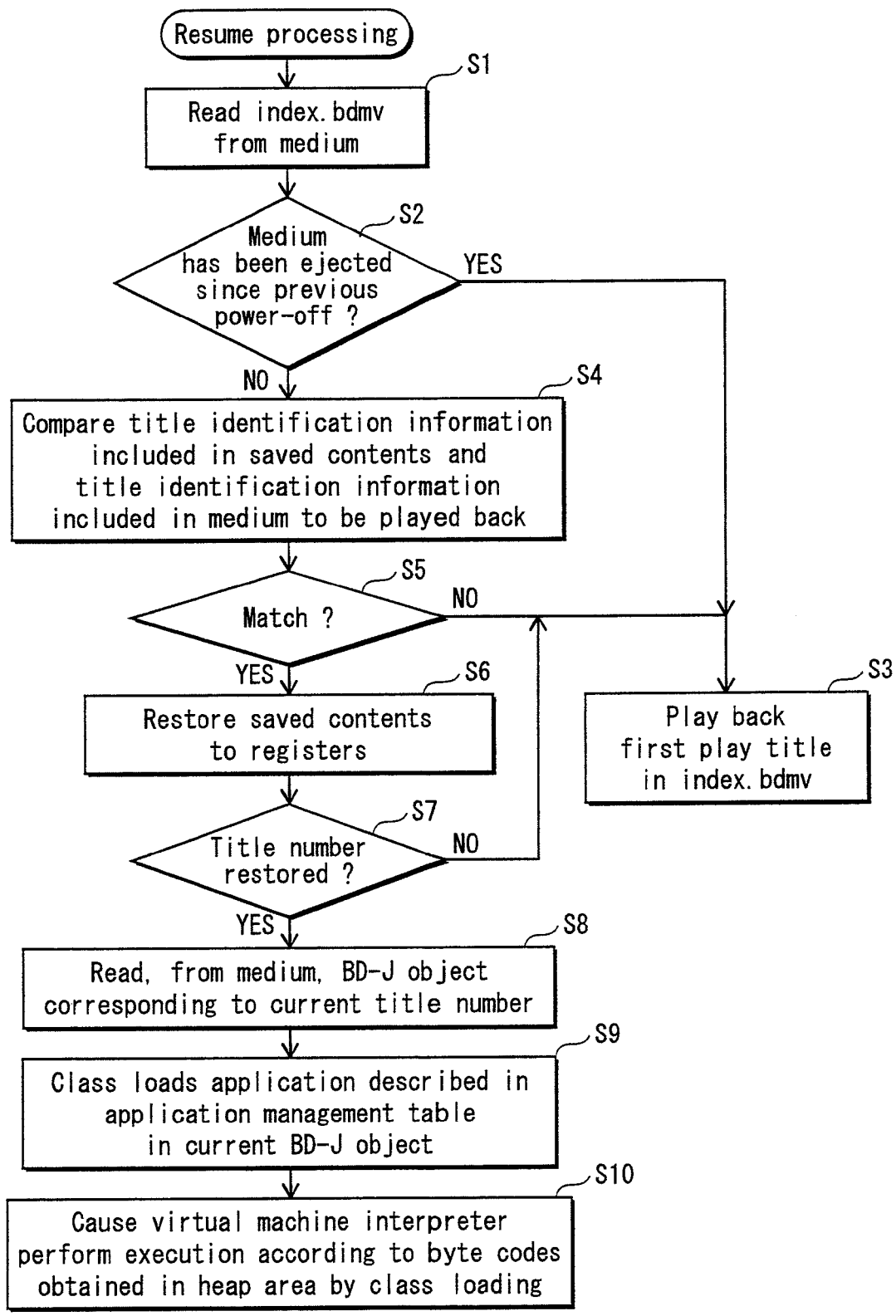
FIG. 9 is a flowchart showing a procedure of resume processing.

FIG. 9 is a flowchart showing a procedure of resume processing.

In step S1, Index.bdmv is read from the BD-ROM, and in step S2, it is judged whether the BD-ROM has been ejected or not. If it is judged affirmatively, the first play title of Index.bdmv is played back in step S3. If No in the step S2, processing from S4 to S10 is executed.

In step S4, the title identification information included in the contents saved for status saving, and the title identification information of the medium to be played back are compared, and in step S5, it is judged whether these two match each other or not. If they do not match each other, the processing moves to S3.

If they match each other, the contents saved for the status saving are restored to the register set (S6), and a judgement is made in step S7. In the step S7, it is judged whether the title number has been restored or not, and if it is judged negatively, the first play title of Index.bdmv is played back.

If it is judged affirmatively in the step S7, the BD-J object corresponding to the current title number is read (S8), and the application described in the application management table in the current BD-J object is class loaded (S9), and the byte code interpreter is caused to execute processing according to the byte codes obtained in the heap memory by the class loader (S10).

Figure 10:
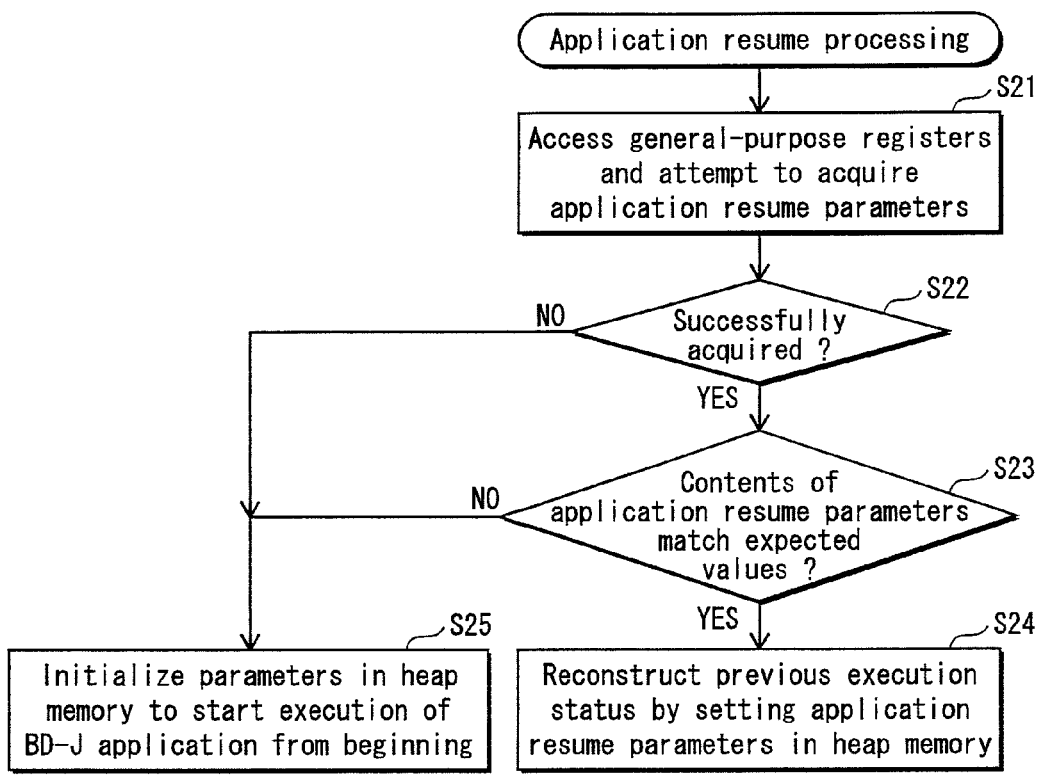
FIG. 10 is a flowchart showing a procedure of application resume parameter processing.

FIG. 10 is a flowchart showing a procedure of application resume parameter processing.

The general-purpose registers are accessed, and an attempt is made to acquire the application resume parameters (S21). Step S22 is a judging step, and if it is judged that the application resume parameters have been successfully acquired, step S23 is executed. In the step S23, it is judged whether the contents of the application resume parameters match expected values or not, and if it is judged affirmatively (S24), the application resume parameters are set in the heap memory to reconstruct the previous execution status.

If it is judged negatively in the step S23, the parameters in the heap memory are initialized in step S25, and the execution of the BD-J application is started from the beginning.

Second Embodiment

In the first embodiment, when an interruption signal indicating a power failure is output, or when the BD-J application receives a notification to stop playback, the application resume parameters are saved. In the present embodiment, variations with respect to the timing of the status saving are disclosed.

<Randomizing Timing of Status Saving>

The BD-J application may save the application resume parameters at an arbitrary timing. The arbitrary timing is, for example, as follows: when the BD-J application detects an update of information included in the application resume parameters; periodically with a predetermined interval (e.g. one second); or when an user operation is received. The timing does not need to be always fixed, and may be changed in accordance with the operation status, peripheral factors of the playback apparatus, or the like.

As described above, as a result of the BD-J application saving the application resume parameters at an arbitrary timing and the mode management module 42 saving the mode management resume at an arbitrary timing, resume playback also becomes possible in a case such as follows: a case where due to an abrupt power cutoff or the like, the mode management module 42 does not or cannot instruct the BD-J module 41 to stop the BD-J application currently being executed.

<Instruction of Timing for Saving>

The BD-J application may explicitly instruct the mode management module 42 when to perform saving for the mode management resume.

For example, efficient saving of the application resume parameters can be achieved if the BD-J application instructs the mode management module 42 when to save the mode management resume, upon completing saving of the application resume parameters.

Furthermore, The ED-J application may explicitly notify the mode management module 42 that the BD-J application has started saving of the application resume parameters. With this structure, the mode management module 42 is able to recognize that the application resume parameters are incomplete at the time of receiving the notification. Consequently, the mode management module 42 becomes able to delay or wait the timing to perform saving of the mode management resume.

<Status Saving Triggered by End of Access to General-Purpose Registers>

Whether or not the currently operating application has finished using the general-purpose register is detected. This detection is performed by receiving an event which the application issues to the middleware upon completing using the general-purpose registers by the application.

<Status Saving Triggered by Instruction from Application>

Whether an instruction to "save the application resume parameters" has been issued or not by an application via the program interface may be judged. In this case, status saving is executed when the instruction to save the application resume parameters is issued by the application.

Third Embodiment

In the first embodiment, how the resume playback apparatus pertaining to the present invention realizes resume playback. In the present embodiment, a modification to set whether resume processing can be executed or not with use of the configurations of the playback apparatus will be described. Information that has been installed in the playback apparatus as the configurations of the playback apparatus and indicates whether the resume processing can be executed or not is referred to as resume support information.

Resume support information can be prepared, for example, by providing an API (Application Programming Interface) for acquiring resume support information, by including resume support information in the register set 24 to make it acquirable from the BD-J application, or the like. Not limited to these, resume support information can be prepared in any manner in the playback apparatus as long as it is acquirable by the BD-J application.

When finding out based on the resume support information that the playback apparatus is unable to perform resume processing, contents do not perform saving of the application resume parameters, and instead, perform in a manner such as follows: giving up resume processing; informing the user that resuming cannot be performed; or making an utmost attempt to realize resuming using any other methods provided by the playback apparatus conforming to the BD-ROM standards. If the contents find out that the playback apparatus is able to perform resume processing, it is possible to save the application resume parameters, create a scenario using the resume processing, and the like.

Authoring staff are able to create a dynamic scenario such as follows: when the contents find out from the acquired resume support information that resumes are supported, the BD-J application saves the application resume parameters, utilizes resuming, and the like. For example, the playback apparatus may have the following structure: the playback apparatus is provided with the above-described API used for controlling the mode management module 42; when calling the API, the BD-J application provides the timing for saving, information to be saved, and the like as arguments; and the called API controls saving by the mode management module 42 in accordance with the given arguments. Or, the BD-J application may be configured to directly control the mode management module 42.

FIG. 11A shows an example of resume support information. The resume support information is a flag having a value of either "1" or "0". The value "1" indicates that status saving of the player status registers and the general purpose registers of the register set is possible. The value "0" indicates that status saving of the player status registers and the general purpose registers of the register set is not possible.

FIG. 11B indicates an API call based on the resume support information. In the figure, the byte code interpreter 32, the middleware 35, and the register set 24 are extracted from the internal structure of the playback apparatus and illustrated. An arrow marked with encircled number "1" schematically shows an acquisition of the resume support information by the BD-J application. The BD-J application refers to the acquired resume support information and judges whether the playback apparatus supports status saving/status restoring. If the BD-J application judges affirmatively, calling an API for status saving/status restoring makes the application resume parameters and the playback status resume parameters to be saved from the register set 24 to the nonvolatile memory 26. An arrow marked with encircled number "2" schematically shows an API call for status saving/status restoring by the BD-J application.

With the above-described API call, as shown by arrows marked with encircled numbers "3" and "4", the application resume parameters and the playback status resume parameters are read from the register set 24 and written into the nonvolatile memory 26.

Fourth Embodiment

In the present embodiment, the following modification is described: information for specifying whether to cause the playback apparatus to perform resuming or not (referred to as "resume information") is recorded on the BD-ROM and provided to the playback apparatus when authoring staff intend for the playback apparatus to perform resuming.

The resume information has aspects as follows:
<Setting whether Restoring/Using is Possible>

The resume information can include the following flags: a flag that indicates whether "restoring" is allowed or not (a restoration flag)"; and a flag that indicates whether "using" is allowed or not (a use flag).

Figures 12A, 12B:
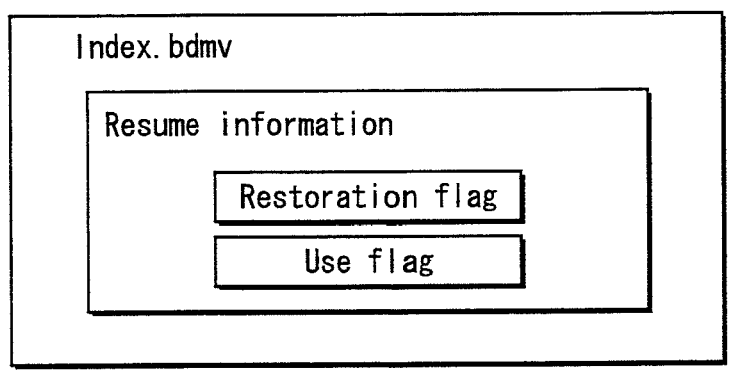
FIG. 12 show resume support information including a restoration flag and a use flag.

FIG. 12A shows resume support information including a restoration flag and a use flag.

FIG. 12B shows bit assign of the restoration flag and the use flag.

The "restoration flag" set to "1" to indicate that the authoring staff intend to allow the application resume parameters and the playback status resume parameters stored in the nonvolatile memory 26 to be restored to the general purpose registers and the player status registers. On the other hand, the "restoration flag" is set to "0" to indicate that the authoring staff do not intend to allow the application resume parameters and the playback status resume parameters stored in the nonvolatile memory 26 to be restored to the general purpose registers and the player status registers.

The "use flag" is set to "1" to indicate that the authoring staff intend to allow the application resume parameters and the playback status resume parameters restored to the register set 24 to be used by the BD-J application and the AV playback engine 15. On the other hand, the "use flag" is set to "0" to indicate that the authoring staff do not intend to allow the application resume parameters and the playback status resume parameters restored to the register set 24 to be used by the BD-J application and the AV playback engine 15.

Figure 13B:
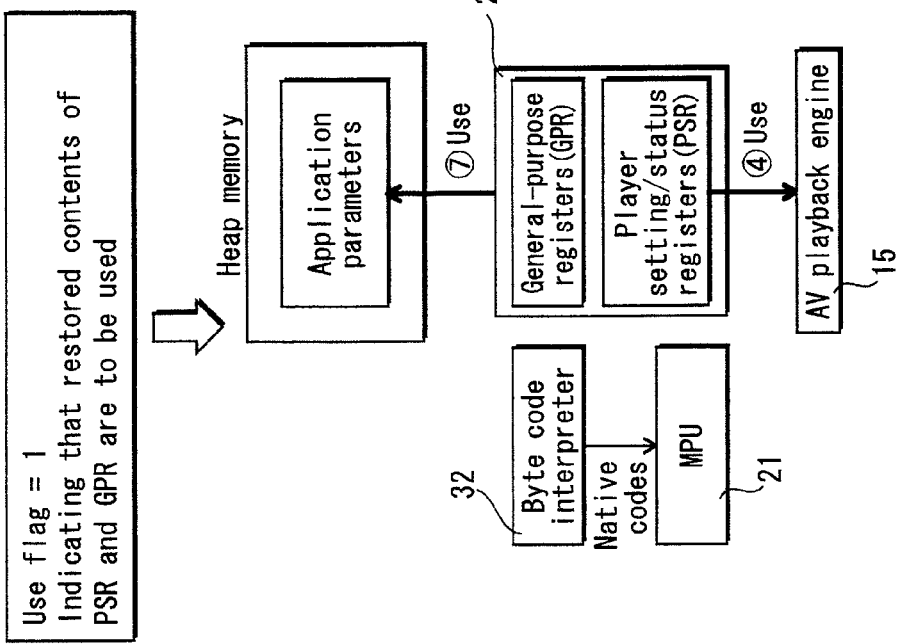
FIG. 13 shows operations in accordance with the restoration flag and the use flag.
Figure 13A:
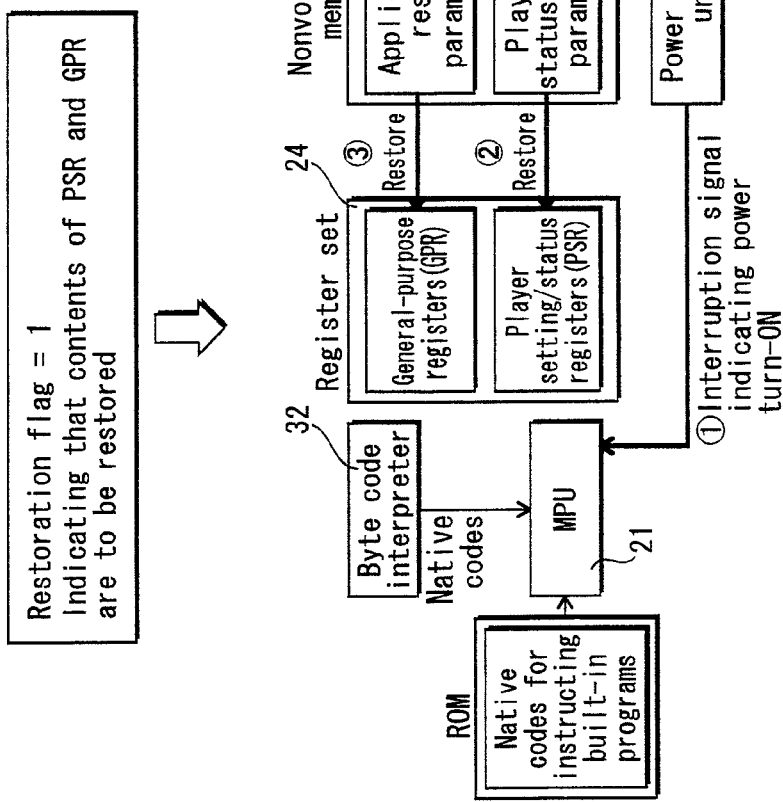

FIG. 13A shows operations when the restoration flag is set to "1". The upper portions of FIG. 13 show the restoration flag set to "1" and the use flag set to "1". The lower portions of FIG. 13 show contents similar to those of FIGS. 8A and 8B. i.e., schematically show restoring from the nonvolatile memory 26 to the register set 24, and transfer from the register set 24 to the BD-J application and the AV playback engine 15. As shown in FIGS. 13A and 13B, the restoring from the nonvolatile memory 26 to the register set 24 is executed under the condition where the restoration flag has been set to "1"; and the transfer from the register set 24 to the BD-J application and the AV playback engine 15 is executed under the condition where the use flag has been set to "1".

As opposed to this, when the restoration flag has been set to "0", restoring from the nonvolatile 26 to the register set 24 is not performed. When the use flag has been set to "0", transfer of the application resume parameters and the playback status resume parameters from the register set 24 to the BD-J application and the AV playback engine 15 is not performed. With use of the restoration flag and the use flag, restrictions such as the following can be imposed on playback operations: restoring from the nonvolatile memory 26 to the register set 24 is performed, but using of the restored application resume parameters and the playback status resume parameters is prohibited.

<Common specification and Individual Specification for Titles>

This improvement is to specify in the BD-ROM in advance that for which of multiple titles recorded on the BD-ROM status saving/status restoring is executed.

Figure 14:
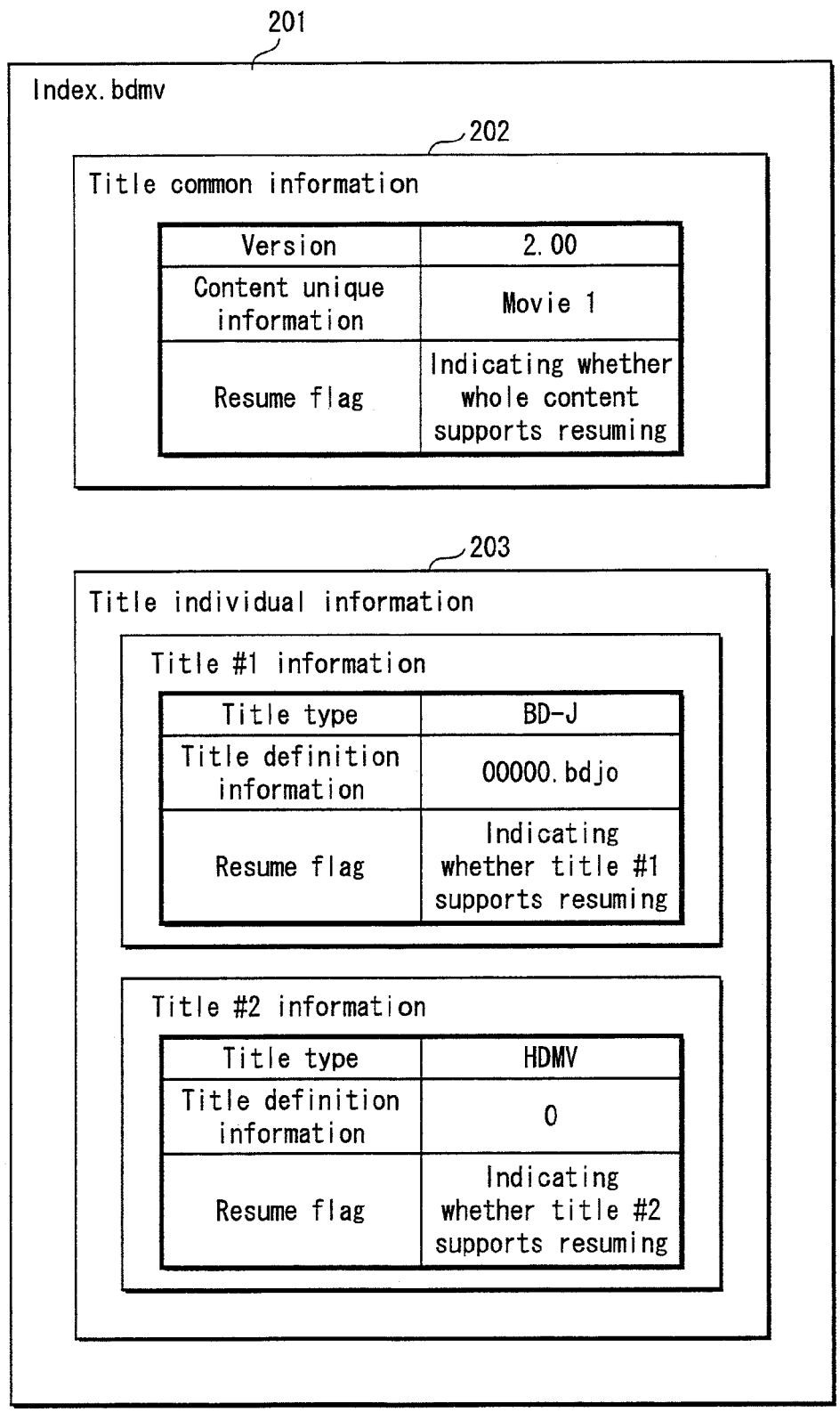
FIG. 14 shows Index.bdmv in which whether status saving/status restoring is available or not is specified for each title.

FIG. 14 shows Index.bdmv in which whether status saving/status restoring is available or not is specified for each title.

Title common information 202 includes a version number of standards on which the multiple titles recorded on the BD-ROM are based, and information unique to the creator of the contents. FIG. 14 shows an example where the version number is 2.00, and the information unique to the content creator is "movie 1". Additionally, a resume flag existing in the title common information indicates that whether status saving/status restoring is available for all of the titles recorded in the BD-ROM.

Title individual information 203 includes information on each title. FIG. 14 shows the following: two titles exist in a content; the title type of title #1 is "BD-J"; the title definition information of the title #1 is the bdjo directory "00000.bdjo"; and the title #1 supports resuming. The resume flag existing in title #1 information indicates whether status saving/status restoring is available for the title #1. The resume flag existing in title #2 information indicates that status saving/status restoring is available for the title #2.

The title type of the title #2 is "HDMV", and the title definition information of the title #2 is defined $0^{th}$ in the MovieObject.bdmv.

In FIG. 14, each piece of title common information and title individual information contains a resume flag.

The playback apparatus 102 varies processing depending on the resume flags included in the content which it plays back.

Figure 15:
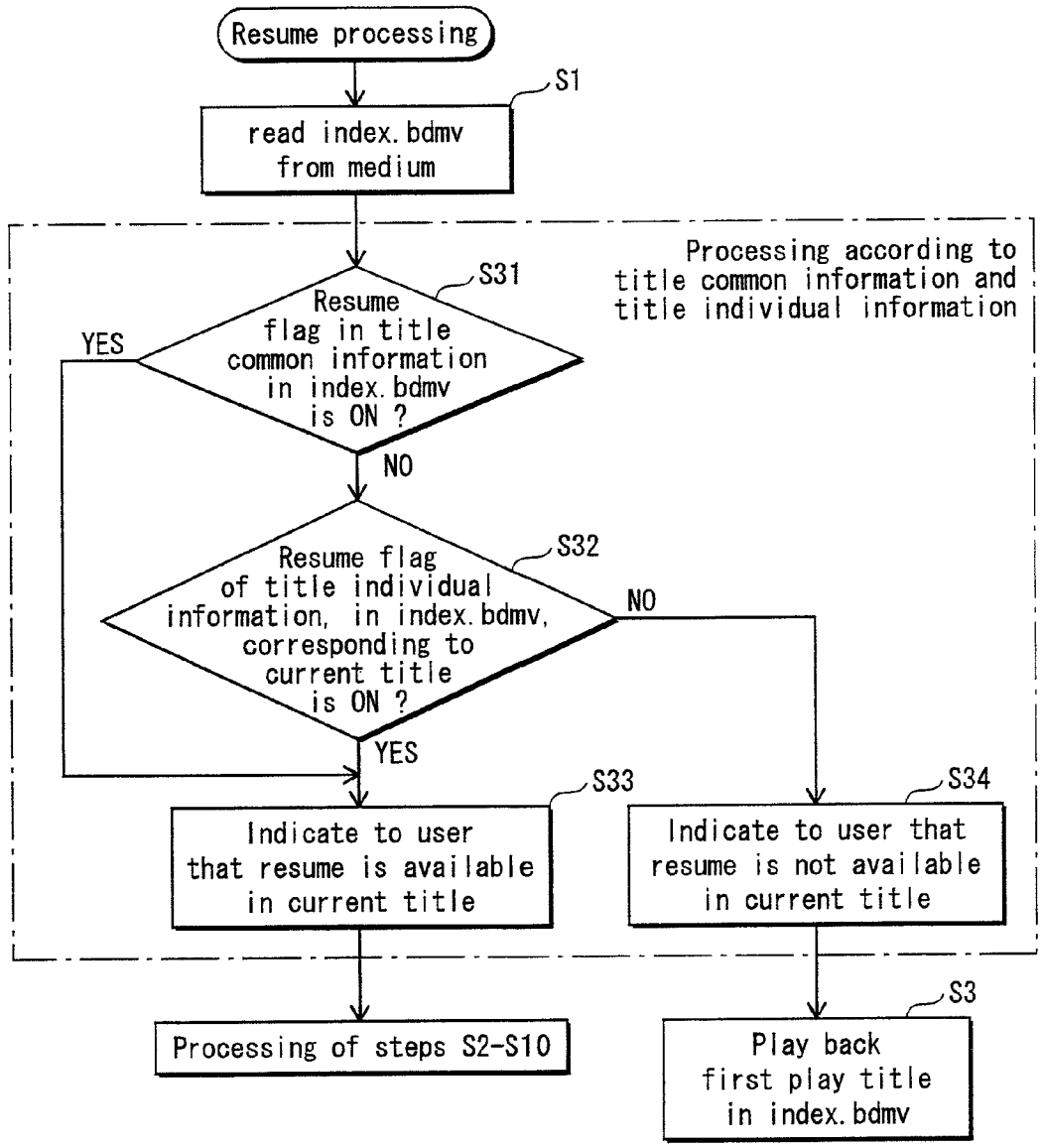
FIG. 15 is a flowchart showing a processing procedure by the playback apparatus 102 using the resume flag.

FIG. 15 is a flowchart showing a processing procedure by the playback apparatus 102 using resume flags.

Prior to starting playback of a content, the playback apparatus 102 reads the index.bdmv 102 (S1), refers to title common information and title individual information included in the index.bdmv 201 and judges whether the resume flag in the title common information is ON, that is, whether the resume flag indicates that resuming is available (S31). If the resume flag in the title common information is ON, the playback apparatus 102 indicates to the user that resuming is available in the current title (S33), and executes processing from S2 to S10 to perform restoring and using.

If the resume flag in the title common information in not ON, that is, indicates that resuming is not unavailable, a judgement is made in step S32. In the step S32, it is judged whether the resume flag in the title individual information corresponding to the current title is ON. If it is ON, the playback apparatus 102 indicates to the user that resuming is available in the current title in step S33, and executes processing from S2 to S10 to perform restoring and using.

If neither the resume flag in the title common information nor the resume flag in the title individual information is ON, the playback apparatus 102 indicates to the user that resuming is not available in the current title in step S34, and plays back the first play title in the step S3.

With this structure, problems due to resume playback can be prevented for contents for which resume playback is not preferred, or for which operations of resume playback cannot be guaranteed.

Figure 16B:
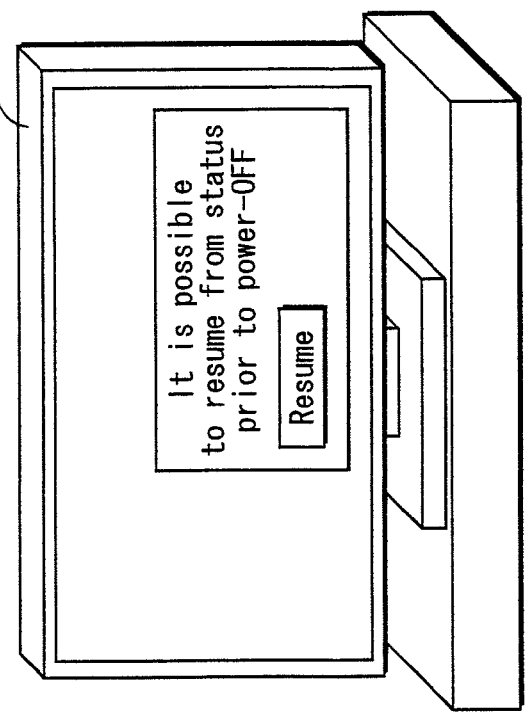
FIG. 16 show screens displayed by the TV 103.
Figure 16A:
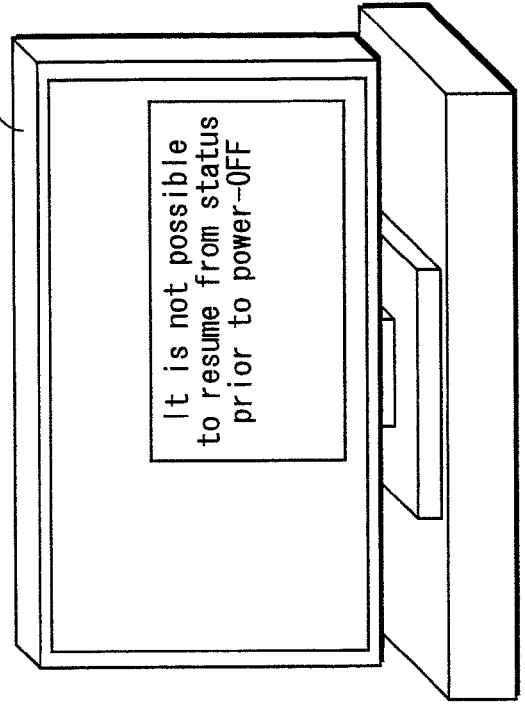

FIG. 16 show screens displayed on the TV 103. FIG. 16A shows a screen displayed by the TV when the resume flag in the title common information or the title individual information corresponding to the current title is ON. This screen shows to the user via a GUI that it is possible to resume from the status prior to the turn-OFF of the power supply. Additionally, a button for receiving an instruction to perform resuming is also displayed. As described above, when playing back a content for which a resume flag is ON, the playback apparatus 102 can indicate to the user that the playback-target content supports resume playback, on the TV 103 or the like.

FIG. 16B shows a screen when no resume flag in the title common information and the title individual information corresponding to the current title is ON. This screen shows to the user via a GUI that it is impossible to resume from the status prior to the turn-OFF of the power supply. When playing back a content for which no resume flag is ON, or when stopping playback of a content, the playback apparatus 102 can display on the TV 103 or the like that the playback-target content does not support resume playback. With this structure, the difference in the processing depending on the resume flag can be indicated to the user.

<Resume information that Specifies Status Saving and Status Restoring of Application Resume Parameters and Playback Status Resume Parameters>

The resume information can include information that indicates whether (i) either status saving and restoring of the application resume parameters or status saving and restoring of the playback status resume parameters should be executed or (ii) both of them should be executed.

A flag specifying whether status saving and restoring of the playback status resume parameters should be executed or not is referred to as a "playback status resume flag"; and a flag specifying whether status saving and restoring of the application resume parameters should be executed or not is referred to as an "application resume flag".

Figure 17A:
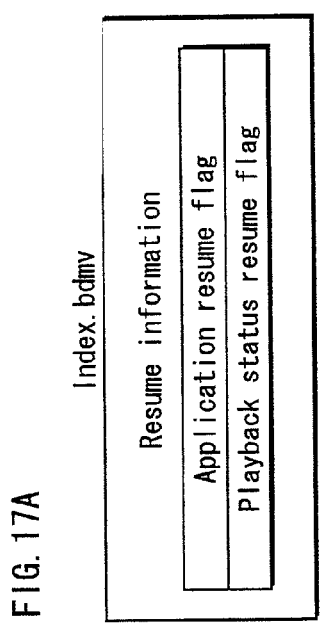
FIG. 17 are diagrams for explaining resume information including a playback status resume flag and an application resume flag.

FIG. 17A shows resume information including a playback status resume flag and an application resume flag.

The playback status resume flag is set to "1" to indicate that status saving and restoring of the playback status resume parameters is possible. On the other hand, the playback status resume flag is set to "0" to indicate that status saving and restoring of the playback status resume parameters is not possible.

The application resume flag is set to "1" to indicate that status saving and restoring of the application resume parameters is possible. On the other hand, the application resume flag is set to "0" to indicate that status saving and restoring of the application resume parameters is not possible.

Figure 17B:
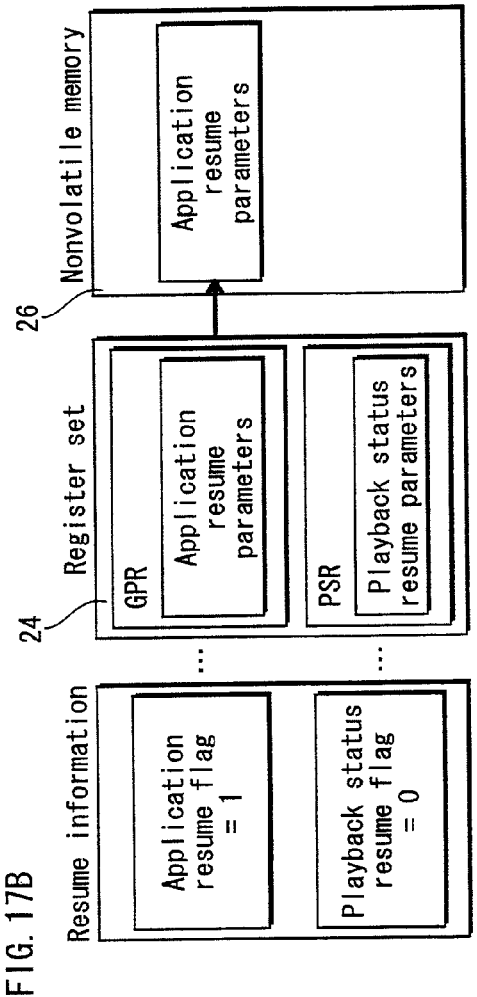

FIG. 17B shows status saving and restoring when the application resume flag is set to "1". The left-hand side portion of FIG. 17B shows resume information including a playback status resume flag and an application resume flag. In the resume information, the application resume flag is set to "1", and the playback status resume flag is set to "0". Accordingly, it is known that only the application resume parameters have been saved from the register set 24 to the nonvolatile memory 26, and the playback status resume parameters have not been saved from the register set 24 to the nonvolatile memory 26.

Figure 17C:
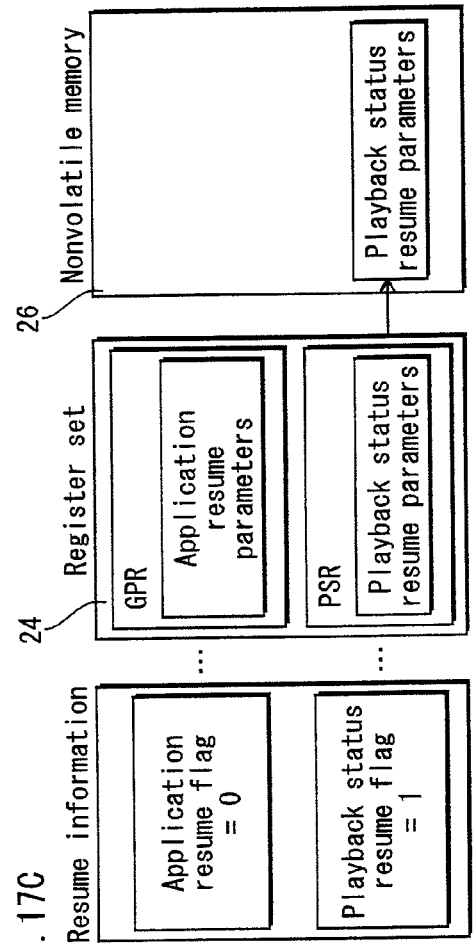

FIG. 17C shows status saving and restoring when the playback status resume flag is set to "1". The left-hand side portion of FIG. 17C shows resume information including a playback status resume flag and a application resume flag. In the resume information, the playback status resume flag is set to "1", and the application resume flag is set to "0". Accordingly, it is known that only the playback status resume parameters have been saved from the register set 24 to the nonvolatile memory 26, and the application resume parameters have not been saved from the register set 24 to the nonvolatile memory 26.

Figure 18:
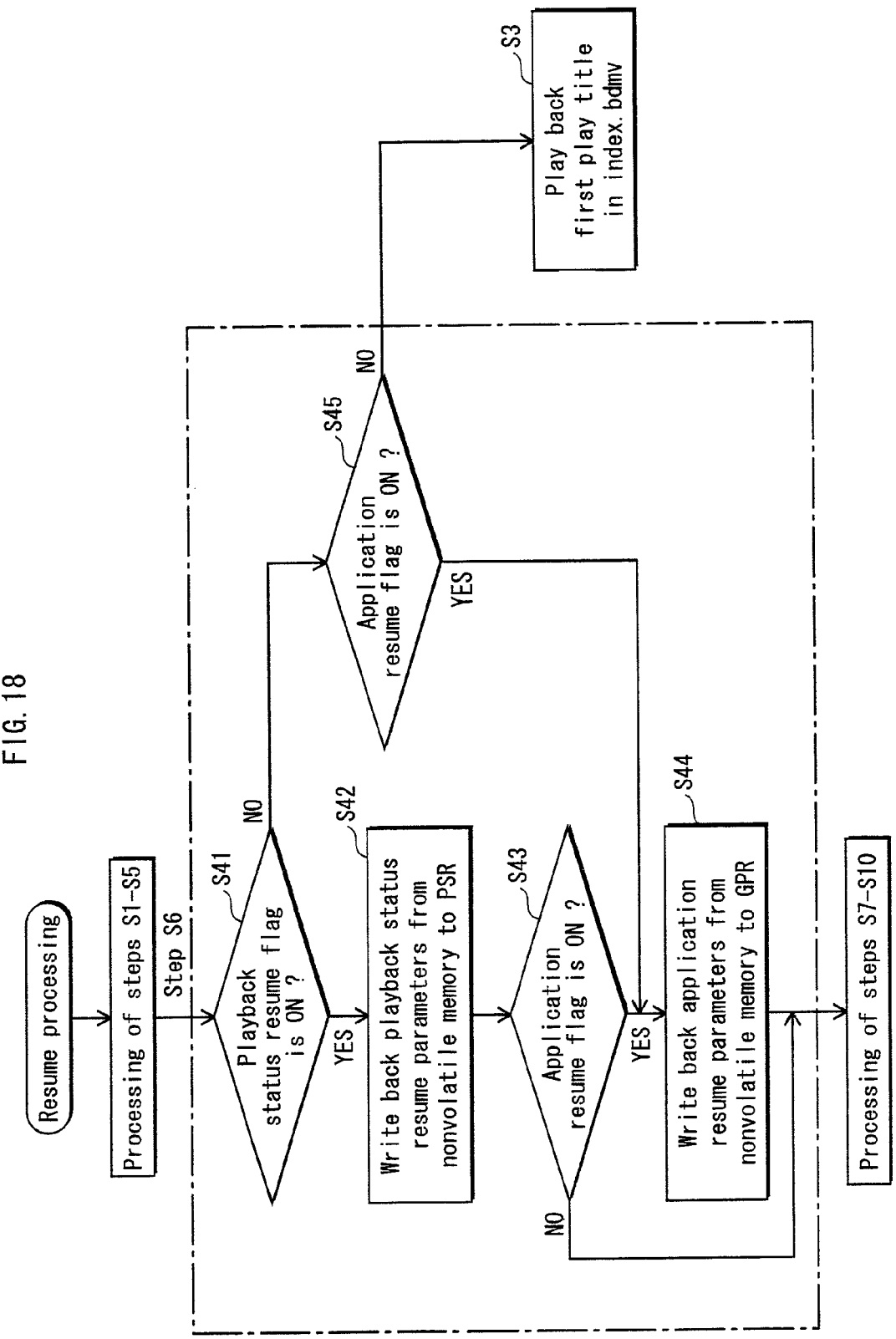
FIG. 18 is a flowchart showing status saving and status restoring using the playback status resume flag and the application resume flag.
Figure 19A:
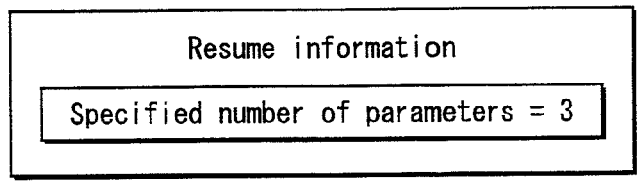
FIG. 19 show examples of resume information that includes specification of the number of application resume parameters.
Figure 19B:
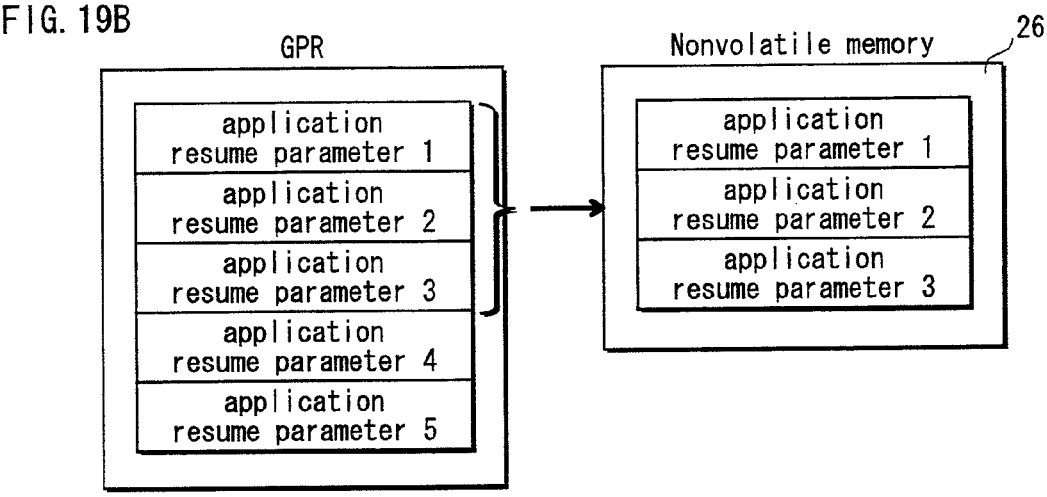
Figure 19C:
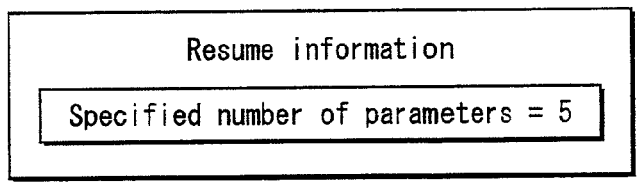
Figure 19D:
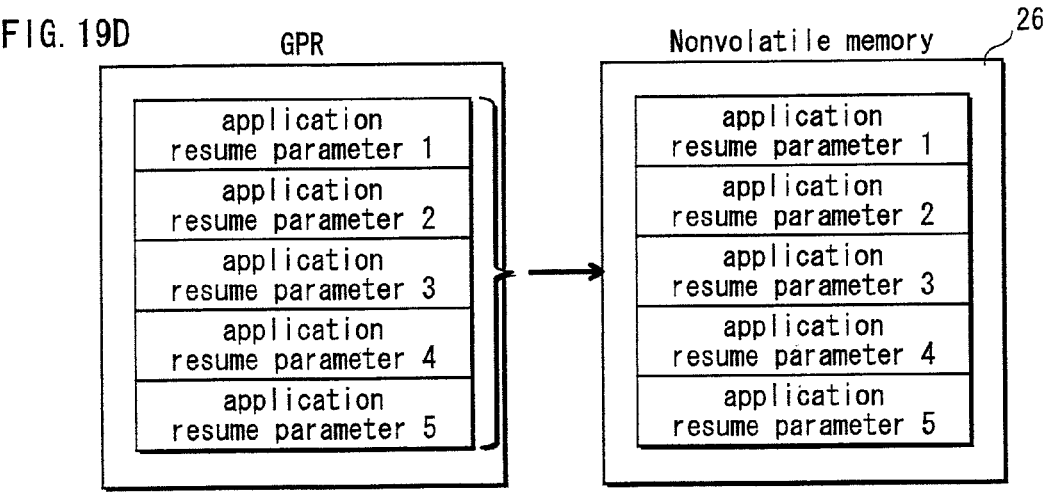

FIG. 18 is a flowchart showing status saving and restoring using the playback status resume flag and the application resume flag. In the present figure, steps S41 to S45 surrounded by a dashed line indicate processing corresponding to the playback status resume flag and the application resume flag.

After Index.bdmv is read in the step S1, a judging step in step S41 is executed. In the step S41, it is judged whether the playback status resume flag is set to "1". If the playback status resume flag is set to "1", the saved playback status resume parameters are restored (S42). If the playback status resume flag indicates "0", the processing advances to step S45. In the step S45, it is judged whether the application resume flag is set to "1". If the application resume flag is set to "0", the first play title is played back in the step S3.

The step S43 is a judging step which is executed after the playback status resume parameters are written back to the player status registers if Yes at the step S41. The judging step in the step S43 judges whether the application resume flag is set to "1". If Yes at the step S43, the application resume parameters are written back from the nonvolatile memory 26 to the general-purpose registers in step S44. If No at the step S43, the step S44 is skipped.

<Resume Information Including Specification of Number>

Described below is a modification to include, in resume information, the number of application resume parameters to be saved. Overhead for status saving and restoring can be minimized by the following: describing, in the resume information, the number of application resume parameters or playback status resume parameters to be saved, and saving the number of application resume parameters described in the resume information to be saved, among the multiple application resume parameters existing in the general-purpose registers.

FIG. 19 show examples of resume information including specification of the number of application resume parameters. In FIG. 19A, the number of application resume parameters to be saved can be specifically specified using the number of general-purpose registers, such as "3". FIG. 19B shows saving of general-purpose registers based on the number specified in FIG. 19A. When the number is specified to be "3", three out of five application resume parameters existing in the general-purpose registers are status-saved into the nonvolatile memory 26. FIG. 19C shows an example where the number of parameters to be status-saved is specified to be "5". FIG. 19D shows saving of the general-purpose registers based on the number specified in FIG. 19C. When the number of parameters is specified to be "5", five out of five application resume parameters existing in the general-purpose registers are status-saved onto the nonvolatile memory 26.

Saving only part, instead of all, of parameters in the general-purpose registers reduces the size of information to be saved, and leads to a decrease in the size of saving destination and the time required for saving.

By pre-determining which range of the register set 24 is to be saved as the application resume parameters, and causing the BD-J application to save only the pre-determined range, a restriction can be imposed on a range to be saved.
<Range to be Saved>

Regarding the range to be saved, it is preferable that the BD-J application notify the mode management module 42 of a range of registers to be saved as the application resume parameters. As a result, an optimal size of application resume parameters for the BD-J application can be saved.
<How to Specify Timing to Save>

The resume information can include information on whether the BD-J application performs saving of application resume parameters at an arbitrary timing. With use of this information, the playback apparatus can change operations, for example, as follows: indicating to the user that resuming of the content currently being played back cannot be performed in a case where the power is suddenly cut off; or changing a timing for the mode management module 42 to perform saving for the mode management resume.

Fifth Embodiment

The present embodiment discloses variations of modification of the nonvolatile memory 26. The variations of the modification of the nonvolatile memory 26 include the following.
<Resume for Each Title)

A pair of application resume parameters and playback status resume parameters for each of multiple titles may be stored in the nonvolatile memory 26, and status saving/status restoring can be executed using these pairs. For example, assume the following case: a title 0001 and a title 0002 exist; after playback of the title 0001 stops, the title 0002 is played back, and after the playback of the title 0002 stops, the title 0001 is played back again. Resume for each title is useful if, in this case, the second playback of the title 0001 starts where the first playback of the title 0001 ended. Kinds of contents are not limited to two kinds; it is applicable as long as there are more than one kind of contents.

FIG. 20 are diagrams schematically showing storage contents of the nonvolatile memory 26.

As shown in the figure, a plurality of pairs of a title identifier and playback status resume parameters are arranged in the nonvolatile memory 26.

The title identifier is information for uniquely identifying a content. For example, the above-mentioned BCA or disc ID can be used. However, any information can be used as the title identifier as long as it is able to uniquely identify a content. In the figure, the title identifiers of the title 0001 and the title 0002 are stored in the nonvolatile memory 26.

Figure 20A:
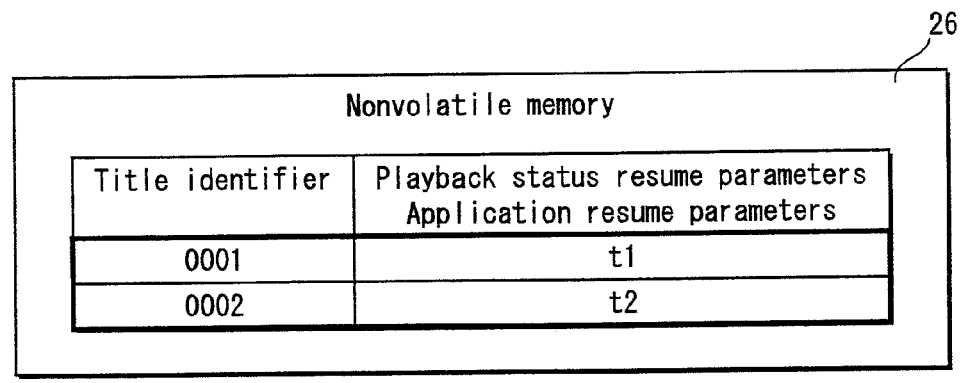
FIG. 20 are diagrams schematically showing storage contents of a nonvolatile memory 26.

The playback status resume parameters are stored in correspondence with these title identifiers. In FIG. 20A, playback status resume parameters and application resume parameters corresponding to a time t1 are stored for the title identifier "0001"; and playback status resume parameters and application resume parameters corresponding to a time t2 are stored for the title identifier "0002".

The playback status resume parameters corresponding to the time t1 are playback status resume parameters for when the content having the title identifier "0001" was played back; and the playback status resume parameters corresponding to the time t2 are playback status resume parameters for when the content having the title identifier "0002" was played back.

Figure 20B:
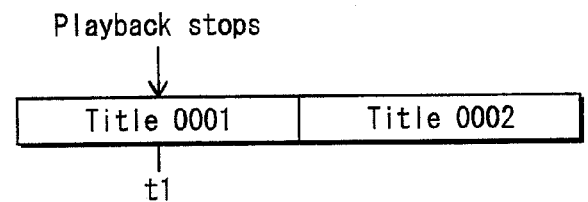

FIG. 20B describes the playback status resume parameters stored in correspondence with the title number 0001. When playback stop is instructed after a lapse of t1 from the start of the playback of the title 0001, t1 is stored as the playback status resume parameters in correspondence with the title 0001.

Figure 20C:
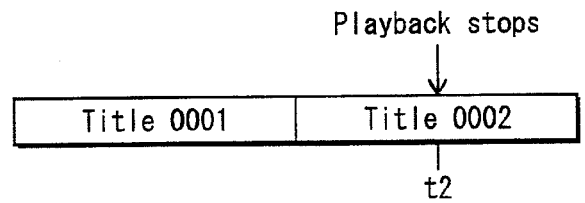

FIG. 20C describes the playback status parameter stored in correspondence with the title number 0002. When playback stop is instructed after a lapse of t2 from the start of the playback of the title 0002, t2 is stored as the playback status resume parameters in correspondence with the title 0002.

Figure 20D:
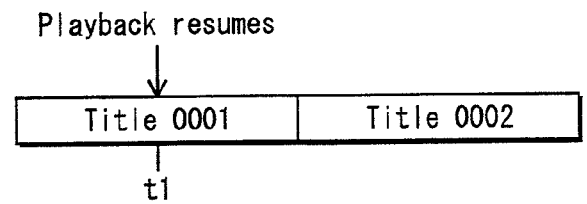

FIG. 20D describes how the playback of the title 0001 resumes after the playback of the title 0002. Because the title identifier of the title 0001 stores the playback status resume parameters of t1, it is known that the playback resumes from the position of t1.

In this state, if the playback of the content having the title identifier "0001" starts, the mode management module 42 can perform resume playback using the playback status resume parameters corresponding to t1. If the playback of the content having the title identifier "0002" starts, the mode management module 42 performs resume playback using the playback status resume parameters corresponding to t2.
<Duplexing Saving Destination)

Saving for the mode management resume may fail due to a power failure during the saving or an occurrence of some kind of failure. Such a problem can be dealt with by duplexing the destination of the saving for the mode management resume, that is, preparing more than two saving destinations and use them sequentially.

Figure 21B:
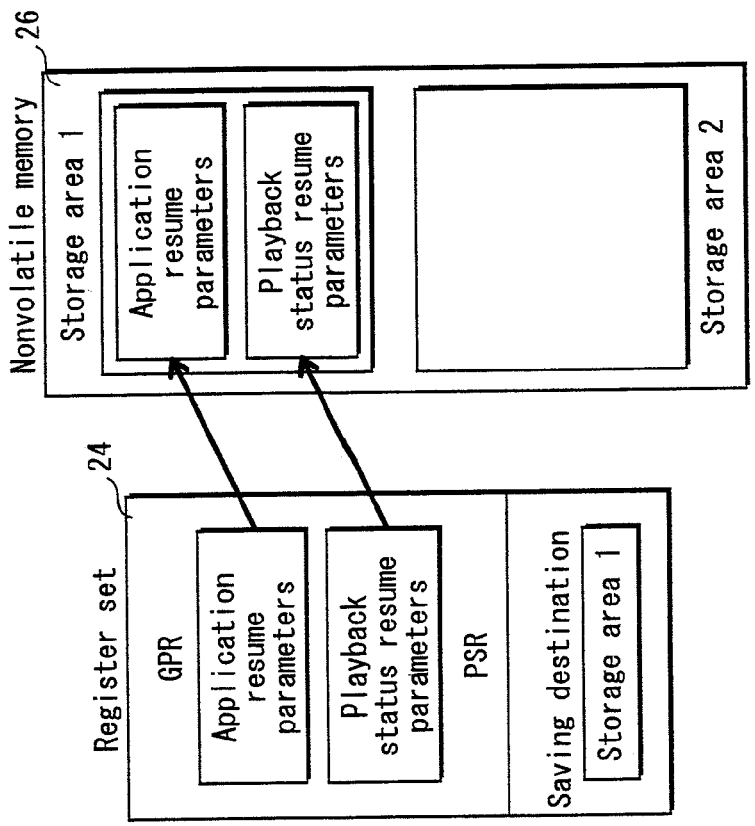
FIG. 21 show the nonvolatile memory 26 which includes two saving destinations: a storage area 1 that is a first saving destination; and a storage area 2 that is a second saving destination.

FIG. 21 show the nonvolatile memory 26 which includes two saving destinations: a storage area 1 that is a first saving destination; and a storage area 2 that is a second saving destination.

Figure 21A:
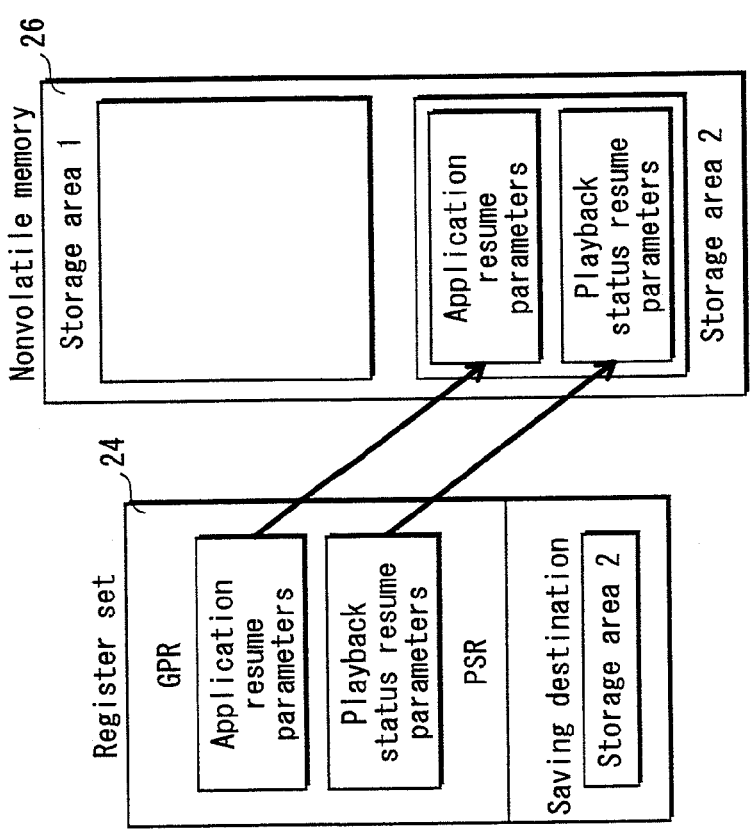

As shown in FIG. 21A, the mode management module 42 saves application resume parameters and playback status resume parameters into the storage area 1, which is the first saving destination, at, the first timing of performing saving for the mode management resume. If the saving is successfully performed, the mode management module 42 records information indicating that the first storage 1 has saved a content in a normal state. At the next timing of performing saving for the mode management resume, as shown in FIG.

21B, parameters are saved into the storage area 2, which is the second saving destination. If this saving is successfully performed, the mode management module 42 records information indicating that the storage area 2 has stored a content in a normal state. With this processing, the saving destination which was last used for saving and which is recorded to have stored a content in a normal state can be used to avoid the above-mentioned problem.

Consequently, the BD-J application itself does not need to record information whether each saving destination has a content saved in a normal state or not.

When it is desired to judge whether each saving destination has a content saved in a normal state or not, it can be judged by reading information indicating that the saving destination has stored a content in a normal state, from among information pieces included in each saving destination. If there are two or more contents that have been saved in a normal state, the most recently saved content is provided for restoring and using.

Note that each of the first saving destination and the second saving destination may include information indicating that the content saved into the saving destination has been saved in a normal state.

(Supplementary Notes)

The present invention has been explained above based on the best mode for carrying out the invention at the time of the application. However, following technical features can be further improved or modified. It should be noted that whether to implement the present invention as shown in the embodiments above or improve/modify the present invention as follows depends on the person who carries out the invention.

Note that the explanations above are merely examples, and the person who carries out the invention can apply the present invention in various manners.

<Programming Language Application Range>

In the above-described embodiments, Java™ is used as the programming language of the virtual machine. However, the programming language does not always need to be Java™, and may be B-Shell, Perl Script, ECMAScript, etc. that are used in UNIX™ OS.

<Content Unboundary Resume>

The resume information may include information indicating whether cross-content resume playback is expected or not. Assume that a content is switched to another content after the mode management resume parameters are saved. With use of the above-mentioned information, the playback apparatus can operate without using the saved mode management resume parameters.

<Directory Structure>

The file and directory structure of the embodiments are only an example, and other structures are applicable in the present invention.

<Multi-Drive>

The BD-ROM drive 401 may read/write from/to readable/writable BD-REs and use various recording media such as an DVD, a CD, and the like, in addition to supporting BD-ROMs.

<Variation of Function Structure>

The function structure shown in the embodiments is an example of a BD-ROM playback apparatus, and the present invention is practicable with other function structures as long as the operations described above can be realized.

<Information Required for Resume>

The ED-J application does not need to acquire information from all of the player status registers, and only needs to acquire information necessary for resume of the BD-J application.

<Format for Saving Register Contents>

When saving for the mode management resume includes saving of contents of the register set 24, the data format of the contents of the register set 24 does not need to be kept as it is. The data format can be changed for saving as long as the contents of the register set 24 can be restored. For example, the contents of the register set 24 can be compressed using a known compression technique, and the compressed contents can be saved when performing saving for the mode management resume.

<Processing after Successful Acquisition of Application Resume Parameters>

It is not always necessary to restore the previous playback status even if the application resume parameters are successfully acquired.

<Differential Data and Changed Data in Mode Management Resume>

Not all the contents of the register set 24 need to be saved when performing saving for the mode management resume. Only sufficient information for restoring needs to be included. For example, it is possible to specify an initial value, and save only a portion which differs from the initial value, or only a portion which has been changed in some way.

<Contents Included in Saving for Mode Management Resume>

Saving for the mode management resume can include other information in addition to contents of the register set 24. For example, the title number of the title which was last played back, information on the HDMV title, a reason for stop, and the like can be included. Content identification information for identifying contents can be included as well. The information for identifying contents may be such as information of the above-described BCA or a value expected to practically realize unique identification, the value being obtained by calculation with respect to a file existing on the recording medium (e.g. a hash value of a file).

<Transfer Method>

Furthermore, the BD-J application may directly or indirectly transfer the application resume parameters to the mode management module 42 without storing the application resume parameters into the register set 24. In this case, when resume playback is performed, the mode management module 42 does not restore the application resume parameters to the register set 24, and instead, directly or indirectly transfers them to the BD-J application.

<Variation of Nonvolatile Memory 26>

A recording medium writable by the removable media drive 3b, the build-in media drive 3a, and the BD drive 401 can be applied as the nonvolatile memory 26. A medium accessible via the network I/F 4 can be also used as the nonvolatile memory 26 if the medium can retain the recorded contents independent of the power supply state of the playback apparatus.

<Secondary Power Supply>

Note that it is desirable to provide a sufficient secondary power supply for performing saving for the mode management resume in case the power supply is abruptly cut off.

It should be noted that the present invention is practicable even if no measures are taken against a case where the power supply is cut off while saving for the mode management resume is performed or saving for the mode management resume fails due to an occurrence of some abnormality.

<Practicability>

The present invention is practicable even if no measures are taken against a case where the power supply is cut off while saving of the application resume parameters is performed or saving of the application resume parameters fails due to an occurrence of some abnormality.

<Embodiment of Programs>

The program shown in each embodiment for performing saving/restoring of the application resume parameters and the playback status resume parameters can be produced in the following manner. First, a software developer creates source programs which realize the above flowcharts and functional construction elements using a programming language. When doing so, the software developer creates such source programs that realize the above flowcharts and functional construction elements, using class structures, variables, array variables, and calls for external functions according to a syntax of the programming language.

The created source programs are supplied to a compiler as files. The compiler translates these source programs to generate object programs.

The translation by the compiler is made up of processes such as syntax analysis, optimization, resource assignment, and code generation. In the syntax analysis, lexical analysis, syntax analysis, and semantic analysis of the source programs are performed to convert the source programs to intermediate programs. In the optimization, operations such as basic blocking, control flow analysis, and data flow analysis are performed on the intermediate programs. In the resource assignment, variables in the intermediate programs are assigned to registers or memories in a target processor, in order to adapt to an instruction set of the target processor. In the code generation, each intermediate instruction in the intermediate programs is converted to program code to thereby obtain the object programs.

The object programs generated in this way are made up of one or more pieces of program code for causing a computer to execute the individual steps of the flowcharts or functional construction elements in the above embodiments. There are various types of program code such as a processor's native code or JAVA (registered trademark) byte code. Also, there are various methods for realizing the individual steps by program code. If each step can be realized using an external function, a call statement for calling the external function serves as program code. Also, there is a case where program code for realizing one step belongs to separate object programs. For an RISC processor which has a limited set of instructions, each step of the above flowcharts may be realized by combining an arithmetic instruction, a logic instruction, a branch instruction, and the like.

Having generated the object programs, a programmer activates a linker for the object programs. The linker assigns the object programs and relevant library programs to memory areas and links them together to generate a load module. Such a generated load module is assumed to be read by a computer, and causes the computer to execute the procedures of the flowcharts and the procedures of the functional construction elements in the above embodiments. The program can be recorded on to a computer-readable recording medium and provided to a user.

<System LSI>

It is desirable that parts of the hardware of the playback apparatus 102 that are mainly composed of logical elements, excluding mechanical structural elements (the BD drive, the removable media drive, and the built-in media drive) and the structural elements (the video plane and the graphics plane) that are implemented on a high-capacity memory, are realized as one system LSI. This is because the parts mainly composed of logical elements can be integrated with high density.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback apparatus 102.

Such a system LSI can be embedded into various types of devices that can play back images, such as a television, game machine, personal computer, one-segment mobile phone, as well as into the playback apparatus 102. The system LSI thus greatly broadens the use of the present invention.

When an elementary buffer, video decoder, audio decoder, and graphics decoder are integrated into a system LSI, it is desirable that the system LSI conforms to the Uniphier architecture.

The system LSI in compliance with the Uniphier architecture is composed of the following circuit blocks.

Data Parallel Processor DPP

A DPP is a SIMD processor in which a plurality of processing elements perform identical operations in parallel. A plurality of arithmetic units each included in a processing element execute one instruction in parallel, so that a plurality of pixels are decoded in parallel.

Instruction Parallel Processor IPP

An IPP is composed of: a "Local Memory Controller" that includes an instruction RAM, an instruction cache, a data RAM, and a data cache; a "Processing Unit" that includes an instruction fetcher, a decoder, an execution unit, and a register file; and a "Virtual Multi Processor Unit" that causes the processing unit to execute a plurality of applications in parallel.

MPU Block

An MPU block is composed of: peripheral circuits such as an ARM core, an external bus interface (Bus Control Unit: BCU), a DMA controller, a timer, and a vectored interrupt controller; and peripheral interfaces such as UART, GPIO (General Purpose Input Output), and a synchronous serial interface.

Stream I/O Block

A stream I/O block communicates, via a USB interface and an ATA Packet interface, input/output data to/from a drive device, a hard disk drive device, an SD memory card drive device connected with the external bus.

AV I/O Block

An AV I/O block is composed of an audio I/O, a video I/O, and an OSD controller and communicates input/output data to/from a TV set and an AV amplifier.

Memory Control Block

The memory control block realizes the reading/writing of data to/from the SD-RAM connected via the external bus. The memory control block is composed of: an internal bus connection unit that controls the internal connection between the blocks; an access control unit that transfers data to/from the SD-RAM connected externally to the system LSI; and an access scheduling unit that arbitrates an access to the SD-RAM among the plurality of blocks.

The following describes a detailed production procedure. First, a circuit diagram of a part to be the system LSI is drawn, based on the drawings that show structures of the embodiments. And then the constituent elements of the target structure are realized using circuit elements, ICs, or LSIs.

As the constituent elements are realized, buses connecting between the circuit elements, ICs, or LSIs, peripheral circuits, interfaces with external entities and the like are defined. Further, the connection lines, power lines, ground lines, clock signals and the like are defined. For these definitions, the operation timings of the constituent elements are adjusted by taking into consideration the LSI specifications, and band widths necessary for the constituent elements are secured. With other necessary adjustments, the circuit diagram is completed.

After the circuit diagram is completed, the implementation design is performed. The implementation design is a work for creating a board layout by determining how to arrange the parts (circuit elements, ICs, LSIs) of the circuit and the connection lines onto the board.

After the implementation design is performed and the board layout is created, the results of the implementation design are converted into CAM data, and the CAM data is output to equipment such as an NC (Numerical Control) machine tool. The NC machine tool performs the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the playback device 102 described in each embodiment above.

It should be noted here that the integrated circuit generated as described above may be called IC, LSI, ultra LSI, super LSI or the like, depending on the level of the integration.

It is also possible to achieve the system LSI by using the FPGA (Field Programmable Gate Array). In this case, a lot of logic elements are to be arranged lattice-like, and vertical and horizontal wires are connected based on the input/output combinations described in LUT (Look-Up Table), so that the hardware structure described in each embodiment can be realized. The LUT is stored in the SRAM. Since the contents of the SRAM are erased when the power is off, when the FPGA is used, it is necessary to define the Config information so as to write, onto the SRAM, the LUT for realizing the hardware structure described in each embodiment.

INDUSTRIAL APPLICABILITY

The resume playback apparatus constituting the present invention can be utilized in manufacturing industries, movie industries related to production of video contents, commercial device industries, and the like.

DESCRIPTION OF REFERENCE NUMERALS

101 BD-ROM
102 Playback apparatus
103 TV
104 Removable medium
105 Remote controller
201 index.bdmv
1 BD drive
2 Read buffer
4 Network I/F
5 Virtual file system
6 Demultiplexer
7 Video decoder
8 Video plane
13 Audio decoder
12 Adder
15 AV playback engine
16 Static scenario memory
17 Rendering engine
24 Register set
26 Nonvolatile memory
30 dynamic scenario memory
40 HDMV module
41 BD-J platform
42 Mode management module
43 UO detection module
44 Dispatcher

The invention claimed is:

1. A playback apparatus for realizing saving and restoring of statuses of a plurality of processes, one of the processes being playback of an AV stream, and another of the processes being processing of an application in conjunction with the playback of the AV stream, the playback apparatus comprising:

a read unit operable to read the application and the AV stream from a recording medium;
a platform unit that allows the application to run;
a playback unit operable to play back the AV stream;
a first storage medium that has a volatile storage area in which playback status parameters have been written, the playback status parameters showing in what state the playback of the AV stream is performed; and
a heap memory that stores parameters used by the application, wherein
the application has written, into the volatile storage area, one or more parameters selected from among a plurality of parameters used in the platform unit as application resume parameters required for resuming an operation of the application after the restoring of the statuses,
the saving of the statuses is performed by writing the application resume parameters and the playback status parameters into a non-volatile storage area of a second storage medium,
the restoring of the statuses is performed by writing the application resume parameters and the playback status parameters back into the volatile storage area,
when the restoring of the statuses is performed, the application checks whether the application resume parameters in the volatile storage area are in a normal state, and
if the application resume parameters are in the normal state, the application resumes the operation by reading the application resume parameters into the heap memory, and
if the application resume parameters are not in the normal state, the application initializes the parameters stored in the heap memory and starts an operation thereof.

2. The playback apparatus of claim 1, wherein
the recording medium further has resume information recorded thereon, the resume information indicating whether or not the playback unit and the application use the playback status parameters and the application resume parameters written back into the volatile storage area, after the restoring of the statuses, and
if the resume information indicates affirmatively, the playback unit resumes the playback based on the playback status parameters written back into the volatile storage area, and the application resumes the operation using the application resume parameters written back into the volatile storage area, and
if the resume information indicates negatively,
the playback unit does not resume the playback of the AV stream, and the application does not resume the operation.

3. The playback apparatus of claim 2, wherein
the resume information includes:
 first flag information indicating whether the application resume parameters and the playback status parameters are to be written back into the volatile storage area or not; and
 second flag information indicating whether the application resume parameters and the playback status parameters written back into the volatile storage area are to be used or not, and
 only if the first flag information and the second flag information indicate affirmatively, the playback unit resumes the playback of the AV stream and the application resumes the operation.

4. The playback apparatus of claim 1 further holding resume support information that indicates whether or not a content of the volatile storage area is able to be saved into the nonvolatile storage area, wherein
 upon activation of the application, the resume support information is transferred to the application, and
 the application resume parameters are written into the nonvolatile storage only if the resume support information received by the application indicates affirmatively.

5. The playback apparatus of claim 4, further comprising:
 an application programming interface (API) function for controlling the saving of the statuses, wherein
 the application makes a call for the API function based on the received resume support information, and
 the saving of the statuses is performed in response to the call for the API function.

6. The playback apparatus of claim 1, wherein
the platform unit includes:
 a class loader operable to a read a class structure including a byte code recorded on the recording medium; and
 a byte coed interpreter operable to convert the byte code read by the class loader into a native code and cause an MPU to execute the native code.

7. The playback apparatus of claim 1, wherein
 the recording medium further has playlist information and operation mode objects recorded thereon, the playlist information constituting a playlist together with the AV stream, and each of the operation mode objects having an application management table which indicates an application to be activated by the class loader when a predetermined title is selected by a user,
 the AV stream played back by the playback unit constitutes one of (a) a playlist instructed by the application to be played back and (b) a playlist specified by the operation mode object to be automatically played back, and
 the application allowed to run by the platform unit is specified by the application management table of the operation mode object to be activated.

8. The playback apparatus of claim 7, wherein
 the recording medium further has an index table recorded thereon, the index table indicating a plurality of title numbers and operation mode objects corresponding with the title numbers,
 the playback status parameters stored in the volatile storage area include a current title number, the current title number indicating a title among the plurality of titles described in the index table that is currently being played back, and
 the application resumes the operation by, after the current title number is written back into the volatile storage medium during the restoring of the statuses, loading the application specified in the application management table that is included in the operation mode object corresponding to the written-back current title number, into the platform unit.

9. The playback apparatus of claim 1, wherein
 the recording medium further has resume information recorded thereon, the resume information including a selection flag that indicates whether either one or both of the application resume parameters and the playback status parameters are to be written back into the volatile storage area,
 the playback apparatus refers to the resume information and judges whether either one or both of the application resume parameters and the playback status parameters are to be written back into the volatile storage area, and
 if the selection flag indicates that the both are to be written back, the playback status parameters and the application resume parameters are written back from the nonvolatile storage area into the volatile storage area.

10. The playback apparatus of claim 1, wherein
 the recording medium further has resume information recorded thereon, the resume information indicating a number of application resume parameters to be saved for the saving of the statuses, and
 a number of the application resume parameters written into the nonvolatile storage area for the restoring of the statuses matches the number of application resume parameters indicated in the resume information, among the plurality of application resume parameters stored in the volatile storage area.

11. The playback apparatus of claim 1, wherein
 the nonvolatile storage area is one of a primary storage area and a secondary storage area,
 during the restoring of the statuses, the primary storage area and the secondary storage area are alternately determined as a status-saving destination, and the application resume parameters and the playback status parameters are written into the status-saving destination, and if writing is successfully performed, information indicating the status-saving destination is stored, and
 during the restoring of the statuses, the status-saving destination indicated by the stored information is determined as a status-restoring source, and the application resume parameters and the playback status parameters are read from the determined status-restoring source.

12. The playback apparatus of claim 11, further comprising:
 a restoring unit operable to, during the restoring of the statuses, (i) for each of the primary storage and the secondary storage, judge whether application resume parameters written therein are in a normal state or not, (ii) judge which of the application resume parameters written in the primary storage and the application resume parameters written in the secondary storage are more recently written, and (iii) select, as the status-restoring source, one of the primary storage and the secondary storage which has the application resume parameters written therein in the normal state and more recently.

13. A playback method for realizing, on a computer, saving and restoring of statuses of a plurality of processes, one of the processes being playback of an AV stream, and another of the processes being processing of an application in conjunction with the playback of the AV stream, wherein
the computer includes:
 a read unit operable to read the application and the AV stream from a recording medium;
 a platform unit that allows the application to run;

a playback unit operable to play back the AV stream;
a first storage medium that has a volatile storage area in which playback status parameters have been written, the playback status parameters showing in what state the playback of the AV stream is performed; and
a heap memory that stores parameters used by the application,
the application has written, into the volatile storage area, one or more parameters selected from among a plurality of parameters used in the platform unit as application resume parameters required for resuming an operation of the application after the restoring of the statuses,
the saving of the statuses according to the playback method is performed by writing the application resume parameters and the playback status parameters into a non-volatile storage area of a second storage medium,
the restoring of the statuses according to the playback method is performed by writing the application resume parameters and the playback status parameters back into the volatile storage area, the method comprising:
when the restoring of the statuses is performed, checking, by the application, whether the application resume parameters in the volatile storage area are in a normal state and if the application resume parameters are in the normal state, the application resumes the operation by reading the application resume parameters into a heap memory, and
if the application resume parameters are not in the normal state, initializing, by the application, the parameters stored in the heap memory and starts an operation thereof.

14. A non-transitory computer-readable recording medium on which is recorded a program causing a computer to execute saving and restoring of statuses of a plurality of processes, one of the processes being playback of an AV stream, and another of the processes being processing of an application in conjunction with the playback of the AV stream, wherein the computer includes:
a read unit operable to read the application and the AV stream from a recording medium;
a platform unit that allows the application to run;
a playback unit operable to play back the AV stream;
a first storage medium that has a volatile storage area in which playback status parameters have been written, the playback status parameters showing in what state the playback of the AV stream is performed, and
a heap memory that stores parameters used by the application,
the application has written, into the volatile storage area, one or more parameters selected from among a plurality of parameters used in the platform unit as application resume parameters required for resuming an operation of the application after the restoring of the statuses,
the saving of the statuses according to the playback method is performed by writing the application resume parameters and the playback status parameters into a non-volatile storage area of a second storage medium,
the restoring of the statuses according to the playback method is performed by writing the application resume parameters and the playback status parameters back into the volatile storage area, and, the computer executes the program to perform the following:
when the restoring of the statuses is performed, checking, by the application, whether the application resume parameters in the volatile storage area are in a normal state and if the application resume parameters are in the normal state, the application resumes the operation by reading the application resume parameters into a heap memory, and
if the application resume parameters are not in the normal state, initializing, by the application, the parameters stored in the memory and starts an operation thereof.

* * * * *